United States Patent
King et al.

(10) Patent No.: US 11,743,233 B2
(45) Date of Patent: Aug. 29, 2023

(54) SCALING IP ADDRESSES IN OVERLAY NETWORKS

(71) Applicant: Oracle International Corporation, Redwood Shores, CA (US)

(72) Inventors: Myron Decker King, Arlington, MA (US); Lucas Michael Kreger-Stickles, Seattle, WA (US); Jagwinder Singh Brar, Bellevue, WA (US); Leonard Thomas Tracy, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/175,285

(22) Filed: Feb. 12, 2021

(65) Prior Publication Data

US 2022/0263789 A1 Aug. 18, 2022

(51) Int. Cl.
*H04L 61/5046* (2022.01)
*H04L 61/5007* (2022.01)
(Continued)

(52) U.S. Cl.
CPC .......... *H04L 61/5046* (2022.05); *H04L 45/20* (2013.01); *H04L 45/7453* (2013.01); *H04L 47/2483* (2013.01); *H04L 61/5007* (2022.05)

(58) Field of Classification Search
CPC . H04L 45/20; H04L 45/7453; H04L 47/2483; H04L 61/2007; H04L 61/2046
See application file for complete search history.

(56) References Cited

U.S. PATENT DOCUMENTS

| 9,716,665 B2 * | 7/2017 | Alizadeh Attar ... H04L 45/7453 |
| 9,882,968 B1 * | 1/2018 | Holgers .............. G06F 9/45533 |

(Continued)

FOREIGN PATENT DOCUMENTS

WO 2020242652 12/2020

OTHER PUBLICATIONS

Jie Li, Yunfeng Nie, and Shijian Zhou. "A dynamic load balancing algorithm based on consistent hash", 2018 2nd IEEE Advanced Information Management,Communicates,Electronic and Automation Control Conference (IMCEC 2018), 5 pages. (Year: 2018).*

(Continued)

*Primary Examiner* — George C Neurauter, Jr.
(74) *Attorney, Agent, or Firm* — Kilpatrick Townsend & Stockton LLP

(57) ABSTRACT

Techniques are disclosed for scaling an IP address in overlay networks without using load balancers. In certain implementations, an overlay IP address can be attached to multiple compute instances via virtual network interface cards (VNICs) associated with the multiple compute instances. Traffic directed to the multi-attached IP address is distributed across the multiple compute instances. In some other implementations, ECMP techniques in overlay networks are used to scale an overlay IP address. In forwarding tables used for routing packets, the IP address being scaled is associated with multiple next hop paths to multiple network virtualization devices (NVDs) associated with the multiple compute instances. When a particular packet directed to the overlay IP address is to be routed, one of the multiple next hop paths is selected for routing the packet. This enables packets directed to the IP address to be distributed across the multiple compute instances.

20 Claims, 19 Drawing Sheets

(51) Int. Cl.
*H04L 45/00* (2022.01)
*H04L 45/7453* (2022.01)
*H04L 47/2483* (2022.01)

(56) References Cited

U.S. PATENT DOCUMENTS

| | | | | |
|---|---|---|---|---|
| 10,244,044 B2* | 3/2019 | Holgers | ............... | G06F 9/45533 |
| 10,735,499 B2* | 8/2020 | Holgers | ................. | H04L 67/10 |
| 10,833,949 B2* | 11/2020 | Liguori | ................... | H04L 41/12 |
| 2005/0147095 A1* | 7/2005 | Guerrero | ............ | H04L 49/9089 |
| | | | | 370/390 |
| 2007/0283015 A1* | 12/2007 | Jackson | .................. | H04L 49/90 |
| | | | | 709/226 |
| 2012/0063458 A1* | 3/2012 | Klink | ................ | H04L 29/12367 |
| | | | | 370/392 |
| 2013/0301598 A1* | 11/2013 | Holm | ................. | H04L 61/2582 |
| | | | | 370/329 |
| 2014/0310391 A1 | 10/2014 | Sorenson, III et al. | | |
| 2015/0295885 A1* | 10/2015 | Congdon | ............ | H04L 61/2557 |
| | | | | 370/392 |
| 2020/0092138 A1* | 3/2020 | Tillotson | ............. | H04L 47/2483 |
| 2020/0092193 A1* | 3/2020 | Tillotson | ............. | H04L 47/2483 |
| 2020/0092194 A1* | 3/2020 | Tillotson | ............... | H04L 45/742 |
| 2020/0092201 A1* | 3/2020 | Tillotson | ............. | H04L 12/4641 |
| 2020/0092252 A1* | 3/2020 | Tillotson | ............. | H04L 61/2535 |

OTHER PUBLICATIONS

"Equal Cost Multipath Load Sharing—Hardware ECMP", Cumulus Linux 4.3, Available Online at: https://docs.cumulusnetworks.com/cumulus-linux-43/Layer-3/Routing/Equal-Cost-Multipath-Load-Sharing-Hardware-ECMP/, Accessed from internet on Mar. 2, 2021, pp. 1-20.

Bush, "The Address Plus Port (A+P) Approach to the IPv4 Address Shortage (RFC6346)", Internet Society Requests For Comment (RFCs), Aug. 26, 2011.

Patel et al., "Ananta: Cloud Scale Load Balancing", ACM SIGCOMM Computer Communication Review, vol. 43, Issue 4, Aug. 27, 2013, pp. 207-218.

International Application No. PCT/US2021/057589, International Search Report and Written Opinion, dated Feb. 10, 2022, 14 pages.

* cited by examiner

SCALING IP ADDRESSES IN OVERLAY NETWORKS

BACKGROUND

In a physical networking environment, horizontal scaling of a network address, such as an Internet Protocol (IP) address, is typically done using load balancers (e.g., Layer 4-to-Layer 7 load balancers). A load balancer advertises an address (sometimes referred to as a virtual IP address or VIP) that clients may communicate with. For example, clients may send packets to this VIP (i.e., the destination IP address of the packets is the VIP address of the load balancer). The load balancer then selects a backend server or node to receive the traffic from among multiple available backend nodes, each of which has its own IP address. In this manner, the load balancer distributes or spreads traffic across the multiple backend nodes. Responses generated by the backend nodes are first received by the load balancer before they are communicated to the clients. There are several problems with using load balancers. Load balancers are quite expensive and complex to configure, and as a result are difficult to scale. Further, since the load balancer has to be actively involved in communications between clients and the backend nodes, their use adds significant latency to the communications.

BRIEF SUMMARY

The present disclosure relates generally to virtualized cloud networking environments, and more specifically to techniques for scaling IP addresses in overlay networks. The IP scaling is achieved without using load balancers. Various embodiments are described herein, including methods, systems, non-transitory computer-readable storage media storing programs, code, or instructions executable by one or more processors, and the like.

In certain embodiments, techniques implemented in a cloud infrastructure (referred to as cloud service provider infrastructure or CSPI) provide IP address scaling in overlay networks by enabling multiple compute instances in the cloud to be associated with the same single overlay IP address. This enables the overlay IP address to be scaled horizontally across the multiple compute instances without using load balancers.

In certain implementations, an overlay IP address can be attached to multiple compute instances. This is done by attaching the overlay IP address to multiple virtual network interface cards (VNICs) and associating the VNICs with the multiple compute instances. The overlay IP address that is attached to the multiple compute instances is referred to as the multi-attached IP address. Traffic directed to the multi-attached IP address is then distributed across the multiple compute instances without using a load balancer. The processing may be performed in stateful or stateless modes.

In some other implementations, Equal-Cost Multi-Path (ECMP) techniques in overlay networks are used to scale an overlay IP address. In such implementations, in forwarding tables that are used by network virtualization devices (NVDs) for forwarding packets, the overlay IP address being scaled is associated with multiple next hop paths to multiple NVDs associated with the multiple compute instances. When a particular packet directed to the overlay IP address is received by an NVD and is to be routed, the NVD uses the forwarding table to select one of the multiple next hop paths for routing the packet, where the selected path is to a particular NVD associated with a particular compute instance from the multiple compute instances associated with the overlay IP address. This enables packets directed to the overlay IP address to be distributed across the multiple compute instances.

According to certain embodiments, a network virtualization device (NVD) may receive a first packet whose destination address is a first Internet Protocol (IP) address. The NVD may determine that a plurality of IP addresses is associated with the first IP address, wherein the first IP address is associated with a plurality of compute instances, and the plurality of IP addresses includes IP addresses of a plurality of NVDs associated with the plurality of compute instances. The first NVD may select a particular IP address from the plurality of IP addresses, wherein the particular IP address is of a particular NVD from the plurality of NVDs, and the particular NVD is associated with a first compute instance from the plurality of compute instances. The first NVD may then communicate the first packet to the particular IP address. The first packet may then be communicated from the particular NVD to the first compute instance. The first IP address may be an overlay IP address and the addresses in the plurality of IP addresses may be physical IP addresses.

In certain embodiments, the first NVD may determine that the plurality of IP addresses is associated with the first IP address based upon IP mapping information stored by the first NVD, where the IP mapping information indicates that the first IP address maps to the plurality of IP addresses. In some other embodiments, the first NVD may determine that the plurality of IP addresses is associated with the first IP address based upon information in a forwarding table, where the forwarding table includes information indicating that a plurality of next hop routes is associated with the first IP address, the plurality of next hop routes identifying the plurality of IP addresses.

The first NVD may use different techniques to select the particular IP address from the plurality of IP addresses. In certain implementations, the first NVD may generate a hash value based upon contents of one or more fields of the first packet. The generated hash value may then be used to select the particular IP address from the plurality of IP addresses. In certain embodiments, a consistent hashing technique may be used to generate the hash values.

In certain implementations, the first NVD may first determine that the first packet belongs to a first network flow. The first NVD may then identify, from flow information stored by the first NVD, a first entry corresponding to the first network flow. The first NVD may then determine that the particular IP address is specified in the first entry as being associated with the first network flow. In some other instances, the first NVD may determine that the flow information stored by the first NVD does not include any entry corresponding to the first network flow. In such a case, the first NVD may select the particular IP address from the plurality of IP addresses using a first selection technique. The first NVD may add an entry to the flow information identifying the first network flow and associating the particular IP address with the first network flow.

The first NVD may receive packets directed to the same first IP address from multiple clients. For example, the first NVD may receive a second packet from another client where the second packet is also directed to the first IP address. For the second packet, unlike for the first packet, the first NVD may select a second particular IP address from the plurality of IP addresses, wherein the second particular IP address is of a second particular NVD from the plurality of NVDs, and the second particular NVD is associated with a second compute instance from the plurality of compute instances. The first NVD may then communicate the second packet to the second particular IP address. The first packet may be received from a first client and the second packet may be received from a second client, where the first client is different from the second client.

In certain embodiments, packets may also be originated from compute instances in the plurality of compute instances that are associated with the same first IP address. For example, a particular NVD from the plurality of NVDs may receive a new packet from the first compute instance, the new packet identifies a destination IP address for a destination client. The particular NVD may then determine whether the new packet is for a new connection or communication to be established between the first compute instance and the destination client, or whether the new packet is a response packet sent by the first compute instance in response to a packet previously received by the first compute instance from the destination client. If the new packet is determined to be for a new connection or communication to be established between the first compute instance and the destination client, an ephemeral port value may be identified to be used for the new packet. The source port field of the new packet may be set to the identified ephemeral port value. The new packet may then be communicated from the particular NVD to an NVD associated with the destination client.

Different techniques may be used for selecting the ephemeral port value. In one embodiment, the ephemeral port value to be used for the new packet is selected from a range of ephemeral port values allocated to the first compute instance, wherein the ephemeral port values in the range of ephemeral port values allocated to the first compute instance are different from ephemeral port values allocated to the other compute instances in the plurality of compute instances. In another embodiment, the particular NVD may use a service for identifying the ephemeral port value. For example, the particular NVD may send a request to the service requesting one or more ephemeral port values. In response, the particular NVD may receive a set of one or more ephemeral port values from the service. The source port field of the new packet may then be set to a value from the set of one of more ephemeral port values. In certain instances, the packet received from the first compute instance may be determined to be a response packet. The response packet may be communicated from the particular NVD to an NVD associated with the destination client.

Various different techniques may be used to determine whether the new packet is for a new connection or is a response packet. For example, the new packet may be identified as a response packet if the new packet contains an acknowledgment. As another example, the new packet may be identified as a response packet if a value in the source port field of the new packet is not an ephemeral port value. As yet another example, the new packet may be identified as a response packet if the particular NVD determines that the new packet is part of an existing network flow.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples are described in detail below with reference to the following figures.

DETAILED DESCRIPTION

Figure 1:
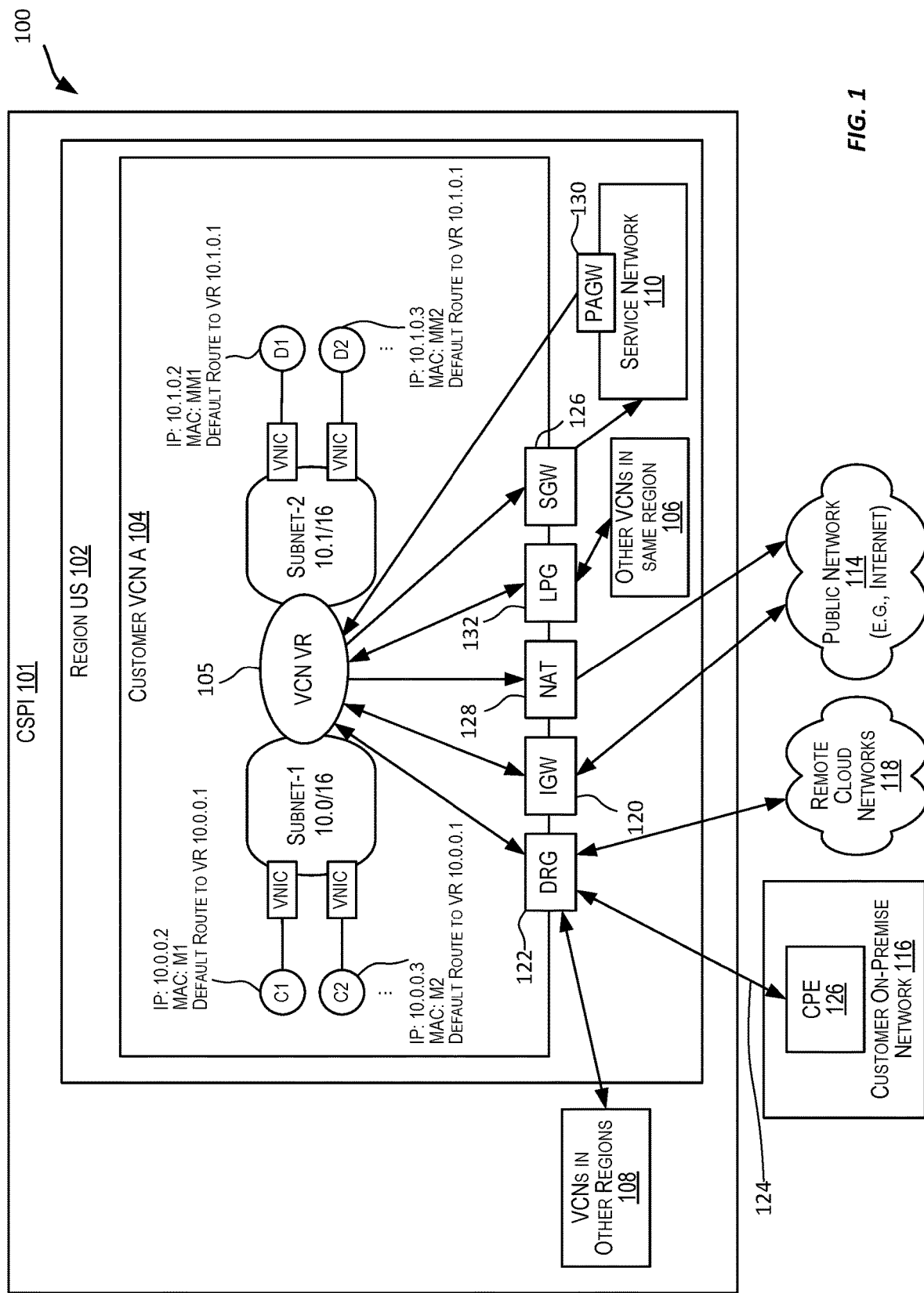
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for scaling IP addresses in a virtualized cloud networking environment. In certain embodiments, an overlay IP address is scaled in a virtualized networking environment without using load balancers, and consequently, the various problems associated with using load balancers are avoided.

As indicated in the Background section, in the physical networking environment, horizontal scaling of an Internet Protocol (IP) address is typically done using load balancers (e.g., Layer 4-to-Layer 7 load balancers). A load balancer advertises a VIP address that clients may communicate with. For example, clients can send packets directed to the VIP, i.e., where the destination IP address of the packets is the VIP address of the load balancer. The load balancer then selects a particular backend server or node to receive the traffic from among multiple available backend nodes, each of which has its own IP address. In this manner, the load balancer distributes or spreads traffic directed to the VIP across the multiple backend nodes. Responses generated by the backend nodes also are first received by the load balancer before they are communicated to the clients. The load balancer thus has to be actively involved in communications between clients and the backend nodes. For example, a packet received by the load balancer has a destination IP address of the load balancer, i.e., the VIP. The load balancer has to change this to the IP address of the selected backend node to which the packet is to be sent before the packet is sent to that backend node. Likewise, when a response packet comes in to the load balancer from a backend node, the packet has a source IP address of that backend node. Upon receiving the response packet, the load balancer has to change that source IP address to that of the VIP of the load balancer, and then communicate the packet to the client. The load balancer also has to do flow tracking that involves tracking the network flows handled by the load balancer. This active participation by the load balancer in the communications adds undesired latency to the communications. Load balancers are quite expensive and complex to configure, and are thus difficult to scale and can fail in complex ways.

In certain embodiments, techniques implemented in a cloud infrastructure (referred to as cloud service provider infrastructure or CSPI) provide IP address scaling in overlay networks by enabling multiple compute instances in the cloud to be associated with the same single overlay IP address. This enables the overlay IP address to be scaled horizontally across the multiple compute instances without using load balancers. Various different techniques are disclosed that enable a single overlay IP address to be associated with multiple compute instances and packets to be properly communicated to and from these multiple compute instances.

In certain implementations, an overlay IP address can be attached to multiple compute instances. This is done by attaching the overlay IP address to multiple virtual network interface cards (VNICs) and associating the VNICs with the multiple compute instances. The overlay IP address that is attached to the multiple compute instances is referred to as the multi-attached IP address. Traffic directed to the multi-attached IP address is then distributed across the multiple compute instances without using a load balancer.

As a use case example, a customer of CSPI may offer a cloud service using resources provided by CSPI. The cloud service may be accessible by clients or consumers of the service using a particular overlay IP address. Using the teachings of the present disclosure, the particular overlay IP address may be attached with multiple compute instances (also referred to as server compute instances since they provide a service) allocated by the customer for providing the cloud service. When a client of the service sends a request to the particular overlay IP address to access the service, network virtualization devices (NVDs) within the CSPI are configured to perform processing to select a particular server compute instance for servicing that request from among the multiple server compute instances attached to the multi-attached IP address, and the client request is then communicated to that selected server compute instance. Different server compute instances may be selected for packets received from different client requests and all directed to the same multi-attached IP address. In this manner, traffic from clients directed to that particular overlay IP address is spread across the multiple server compute instances, and all this is achieved without using a load balancer.

In embodiments implementing multi-attached IP addresses, the processing for forwarding packets addressed to a multi-attached overlay IP address to the compute instances attached to the multi-attached IP address may be performed in a stateful or stateless mode. In stateful mode processing, the NVDs facilitating the communication of packets directed to the multi-attached IP address store network flow information and use it to identify where a packet is to be forwarded to facilitate transmission of the packet to a particular server compute instance attached to a multi-attached IP address. In stateless mode processing, the NVDs do not store or use network flow information. Instead, in stateless mode processing, one or more headers of the packet directed to the multi-attached IP address are hashed and the resultant hash value is used to select a particular compute instance from among the multiple compute instances to which to send the packet. The packet is then forwarded to that selected compute instance. In both stateless and stateful processing, packets belonging to the same network flow (e.g., a Transmission Control Protocol (TCP) network flow, a User Datagram Protocol (UDP) network flow) are forwarded to the same compute instance from among the multiple compute instances with the multi-attached IP address for consistency of processing.

In some other implementations, Equal-Cost Multi-Path (ECMP) techniques in overlay networks are used to scale an overlay IP address. In such implementations, in forwarding tables used by NVDs for forwarding packets, the overlay IP address being scaled is associated with multiple next hop paths to multiple NVDs associated with the multiple compute instances. When a particular packet directed to the overlay IP address is received by an NVD and is to be routed, the NVD uses the forwarding table to select one of the multiple next hop paths for routing the packet, where the selected path is to a particular NVD associated with a particular compute instance from the multiple compute instances associated with the overlay IP address. This enables packets directed to the overlay IP address to be distributed across the multiple compute instances.

In certain embodiments, for both multi-attached IP address implementations and ECMP in overlay network implementations, the infrastructure enables a compute instance (referred to as a client compute instance) to send a packet to an overlay IP address that is associated with multiple compute instances, either as a multi-attached IP address or via ECMP techniques, and the packet is properly forwarded to a particular compute instance from among the multiple compute instances. Thus, a client compute instance can initiate communications using the single overlay IP address to compute instances associated with the single overlay IP address. The compute instance receiving the packet can then respond to the packet, for example, send a response packet to the client compute instance. Additionally, compute instances associated with the single overlay IP address can also initiate new communications or connections (i.e., not a response) to a client. This is not possible with conventional load balancers where connections to compute instances sitting behind a load balancer have to be externally initiated and cannot be initiated by the instances sitting behind the load balancer. A client compute instance that is the target of such a new connection or communication is able to respond to that communication and the client response is forwarded to the appropriate compute instance that sent the initial communication.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage);

networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 12, 13, 14, and 15 (see references 1216, 1316, 1416, and 1516) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 12, 13, 14, and 16, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 12, 13, 14, and 15 (for example, gateways referenced by reference numbers 1234, 1236, 1238, 1334, 1336, 1338, 1434, 1436, 1438, 1534, 1536, and 1538) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
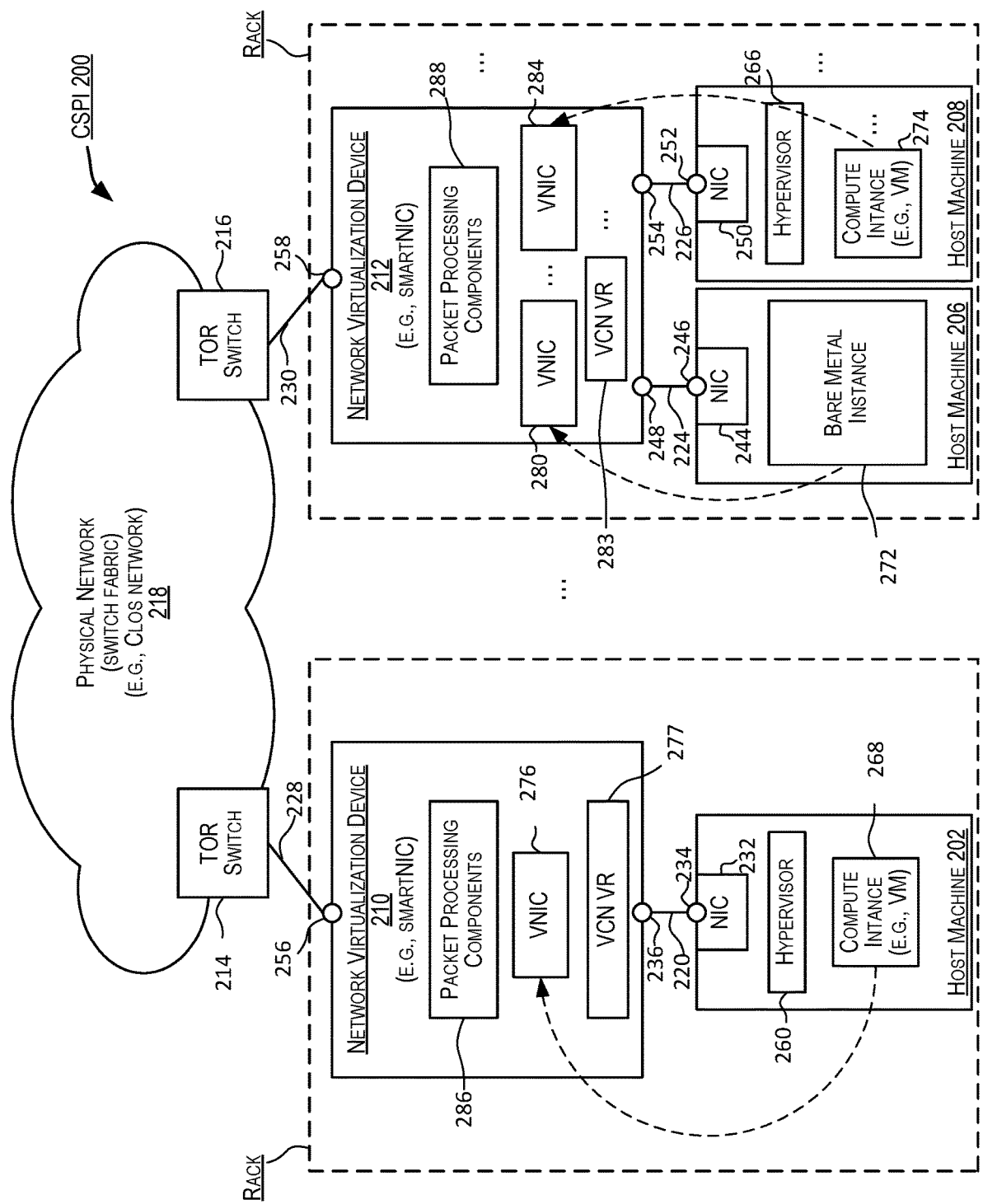
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
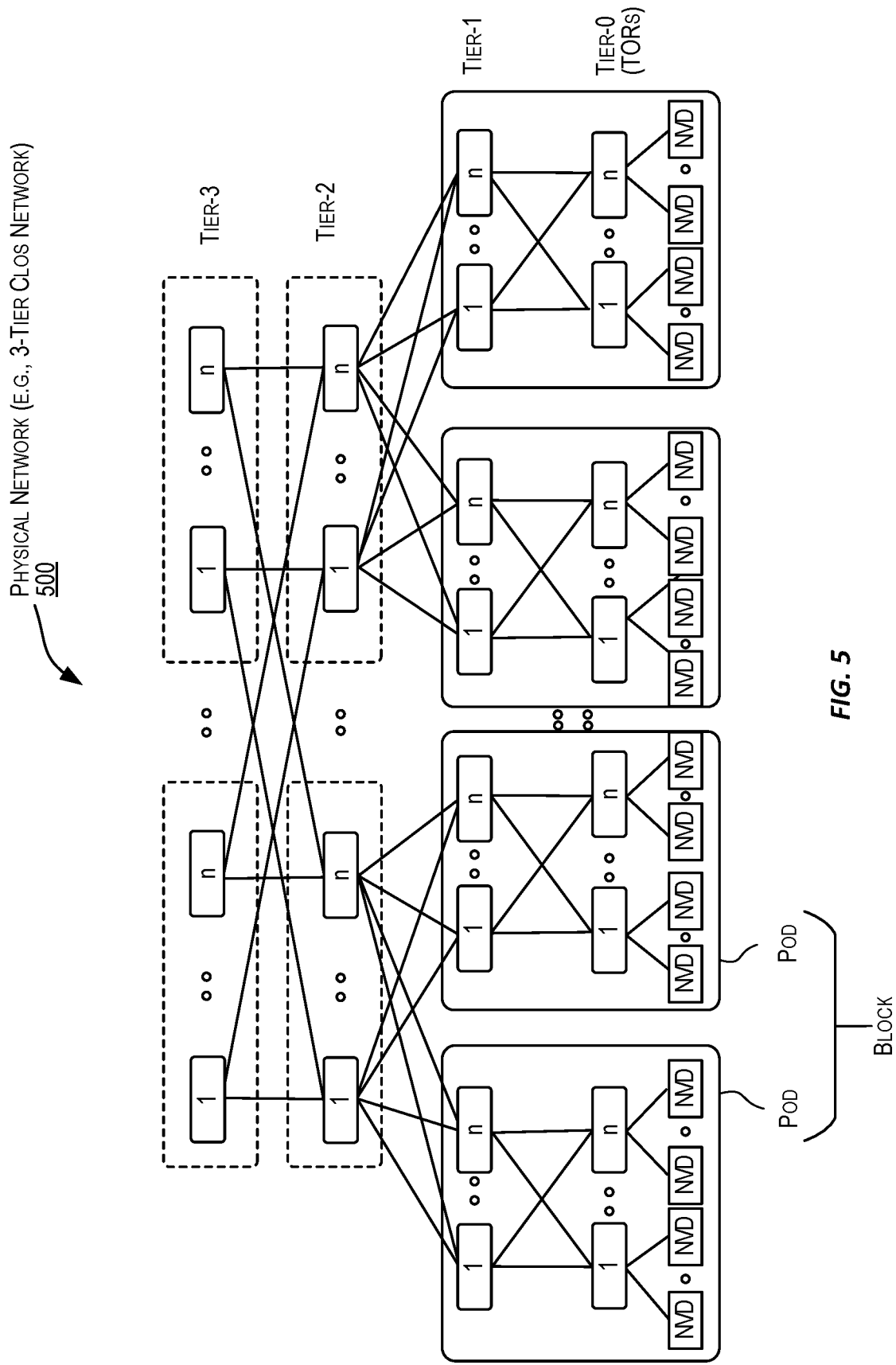
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
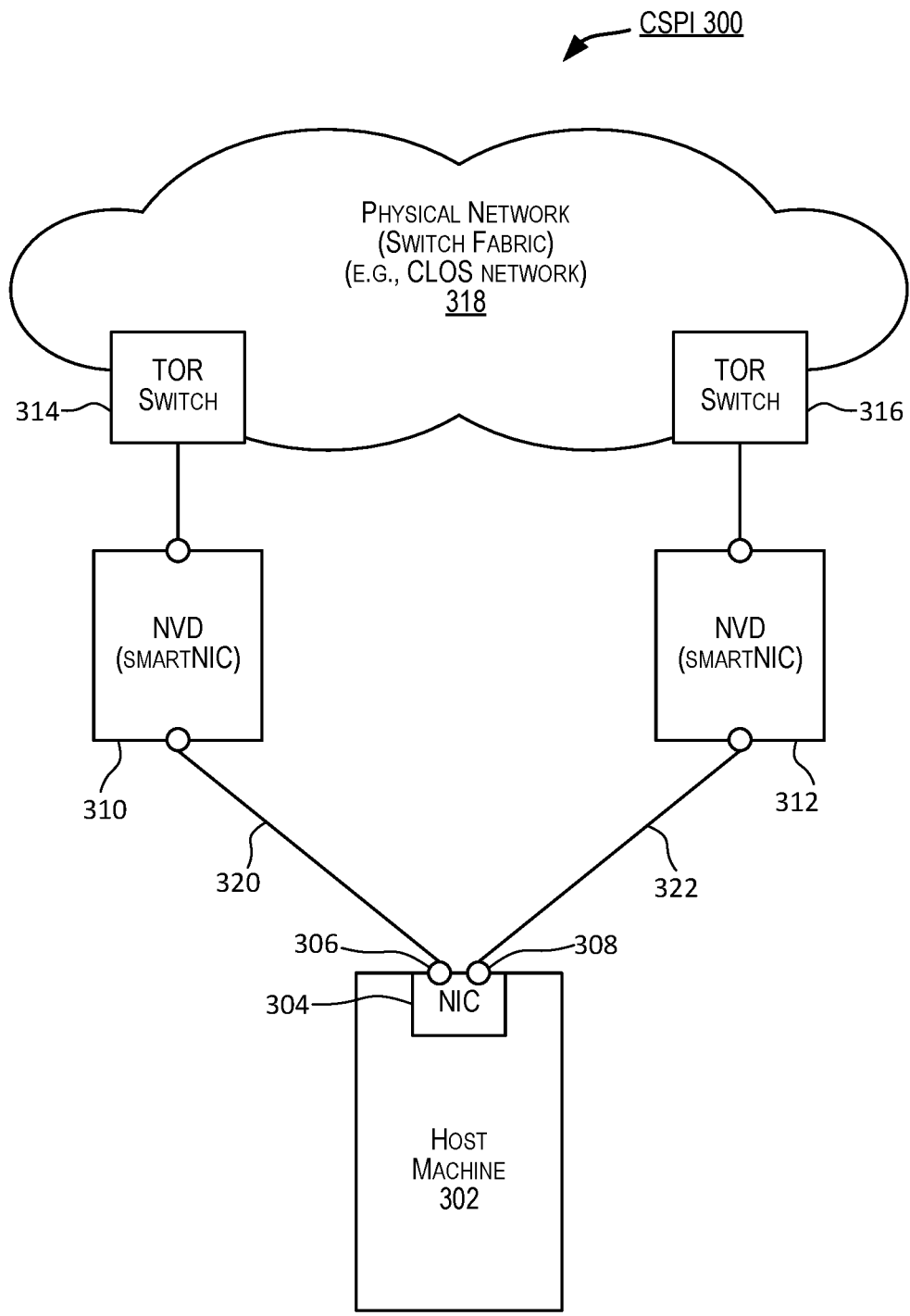
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 12, 13, 14, and 15 (see references 1216, 1316, 1416, and 1516) and described below. Examples of a VCN Data Plane are depicted in FIGS. 12, 13, 14, and 15 (see references 1218, 1318, 1418, and 1518) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
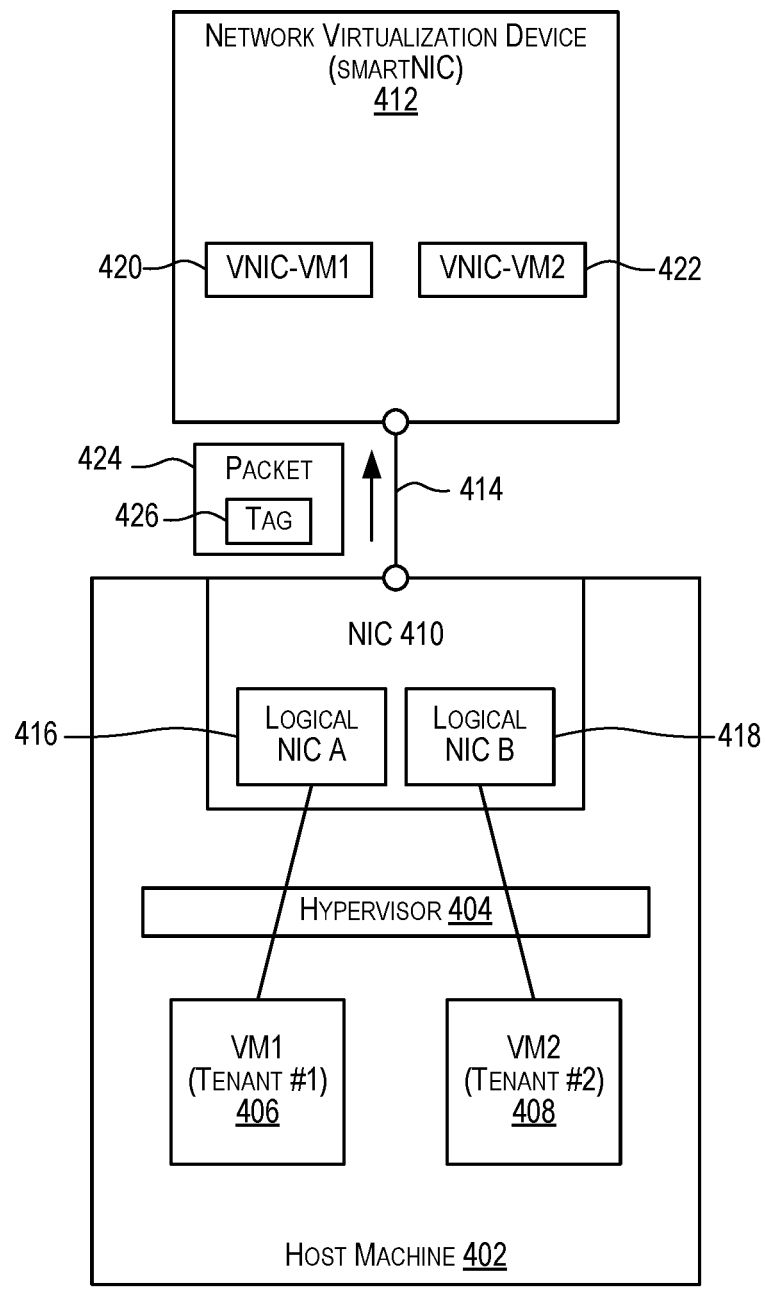
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Scaling IP Addresses in Overlay Networks

The present disclosure provides techniques for scaling IP addresses in a virtualized cloud networking environment. In certain embodiments, an IP address is scaled in a virtualized networking environment without using load balancers, and consequently, the various problems with using load balancers are avoided.

As previously described, cloud service provider infrastructure (CSPI) provided by an IaaS cloud service provider (CSP) may be used to host multiple overlay networks (also referred to as Virtual Cloud Networks or VCNs) for multiple customers of the CSP. The CSPI includes a physical network comprising multiple physical network devices such as host machines, NVDs, routers, switches, etc. IP addresses associated with the network devices in the physical network are referred to as physical IP addresses. An overlay network (or VCN) is a logical or virtual network that runs on top of the physical network. A physical network can support one or more overlay networks or VCNs. Typically, overlay networks are customer specific, referred to as customer VCNs. A customer can deploy one or more compute instances and other resources in a customer's VCN, where these compute instances can be virtual machines, bare metal instances, etc. Overlay IP addresses are IP addresses associated with compute instances and other resources (e.g., load balancers) in an overlay network, such as with compute instances deployed in a customer's VCN. Two different customers could potentially use the same overlay IP address in their respective VCNs.

As previously indicated, in certain implementations, a single overlay IP address may be associated with multiple compute instances by attaching the single overlay IP address to multiple virtual network interface cards (VNICs) and associating the VNICs with the multiple compute instances. The overlap IP address that is attached to the multiple compute instances is referred to as the multi-attached IP address. In some other implementations, Equal-Cost Multi-Path (ECMP) techniques in overlay networks are used to scale an overlay IP address. Both of the multi-attached IP address technique and ECMP-based technique are described below in more detail.

Multi-Attached IP Address

A virtualized cloud network infrastructure is provided that enables IP scaling by enabling a single overlay IP address to be attached with multiple compute instances. This enables the IP address to be scaled horizontally across the multiple compute instances without using load balancers. The novel infrastructure enables traffic directed to the single multi-attached overlay IP address to be distributed across the multiple server compute instances to which the single overlay IP address is attached, without using a load balancer.

The overlap IP address that is attached to the multiple compute instances is referred to as a multi-attached IP address. The multi-attached IP address associated with a compute instance can be used to communicate with that compute instance, for example, to send packets to that compute instance and to receive packets from the compute instance. In certain implementations, an overlay IP address can be attached to multiple compute instances by attaching the overlay IP address to multiple virtual network interface cards (VNICs) and associating the VNICs with the multiple compute instances. Traffic directed to the multi-attached IP address is then distributed across the multiple compute instances without using a load balancer.

Figure 6A:
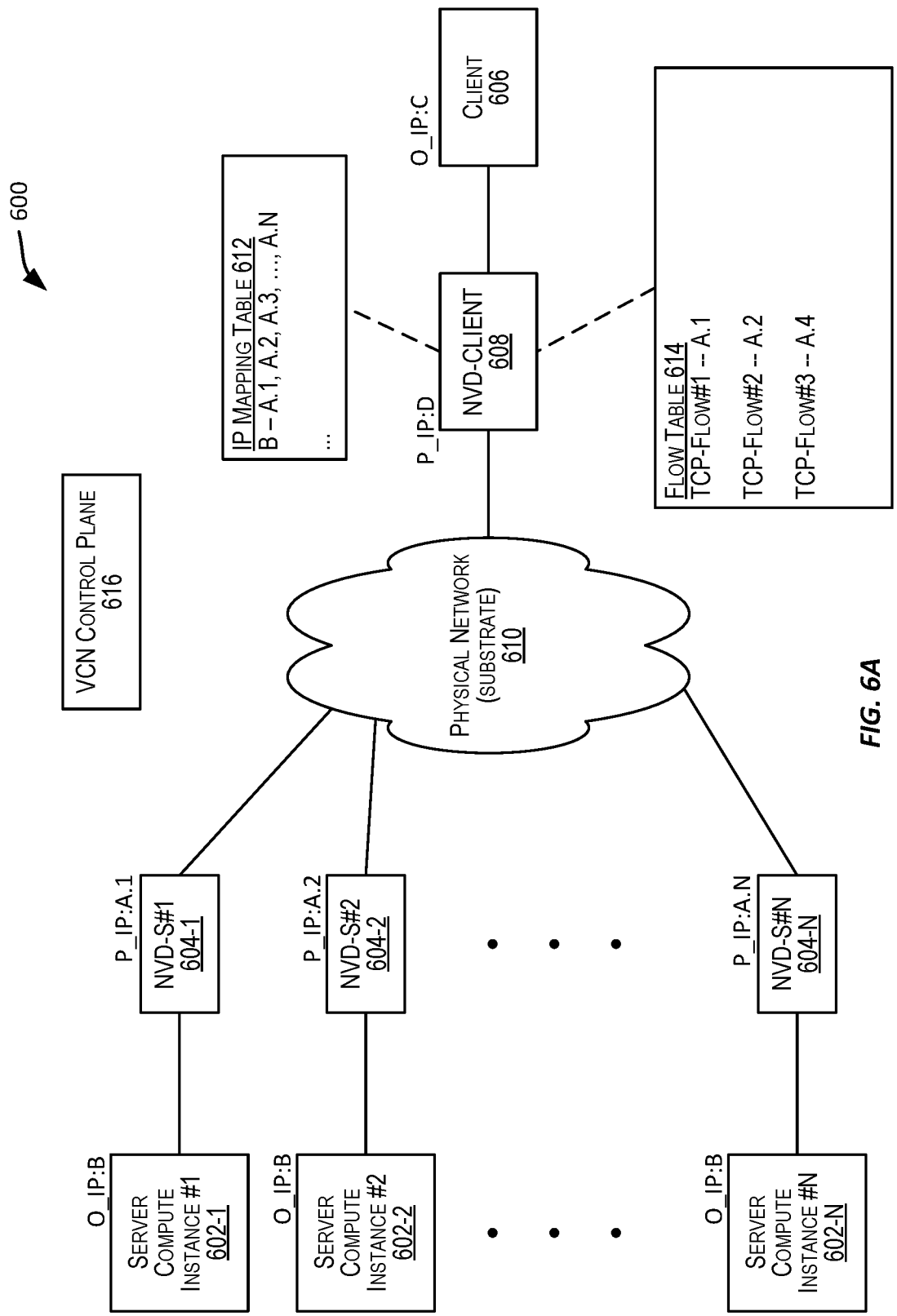
FIG. 6A shows an example of a distributed virtualized multitenant cloud environment that may be hosted by infrastructure (cloud service provider infrastructure, CSPI) provided by a cloud service provider (CSP) and which enables scaling of an overlay IP address using multi-attached IP addresses in stateful mode processing without using load balancers according to certain embodiments.
Figure 6B:
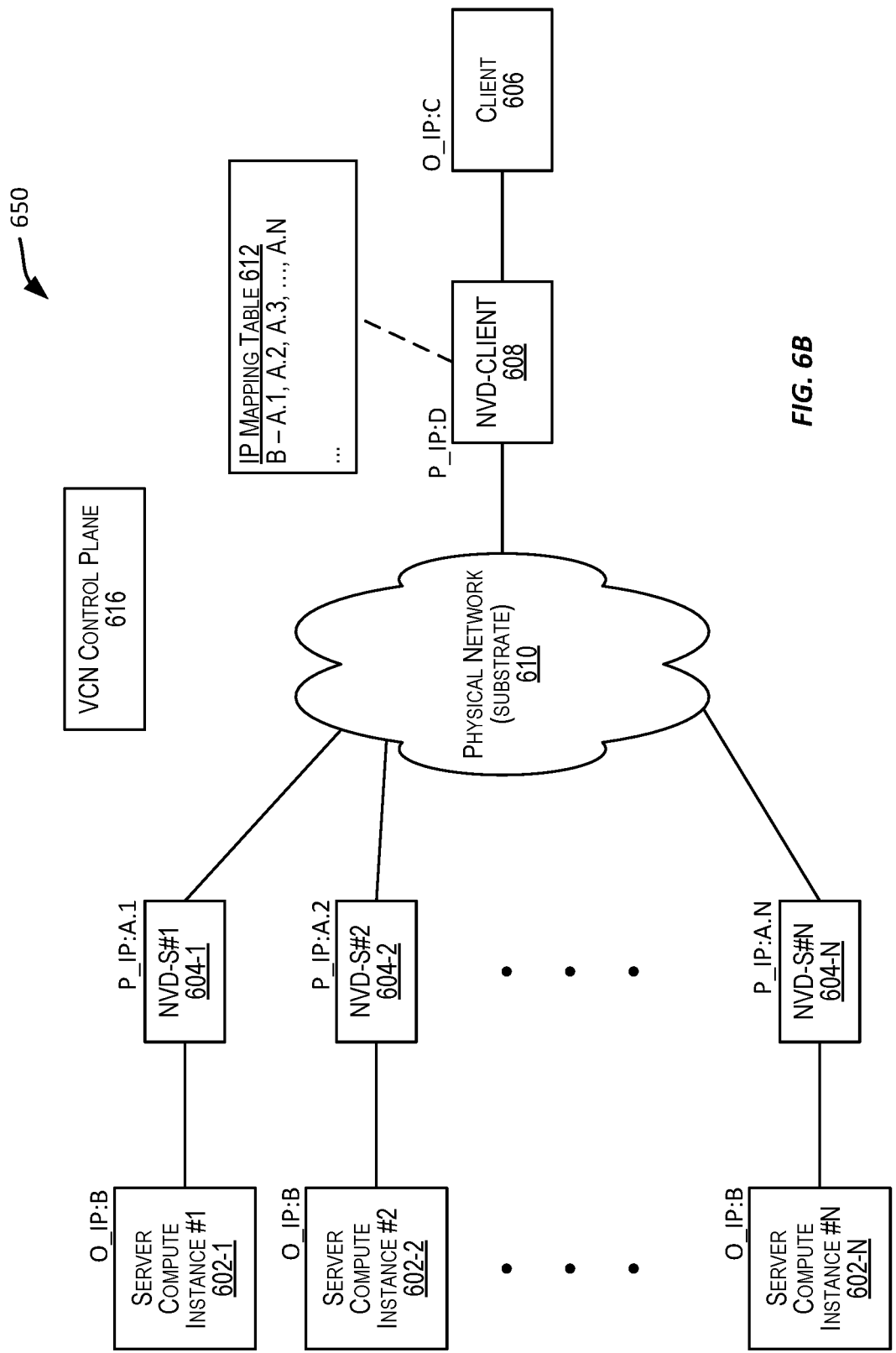
FIG. 6B shows an example of a distributed virtualized multitenant cloud environment that may be hosted by CSPI provided by a cloud service provider (CSP) and which enables scaling of overlay IP addresses using multi-attached IP addresses in stateless mode processing without using load balancers according to certain embodiments.
Figure 7A:
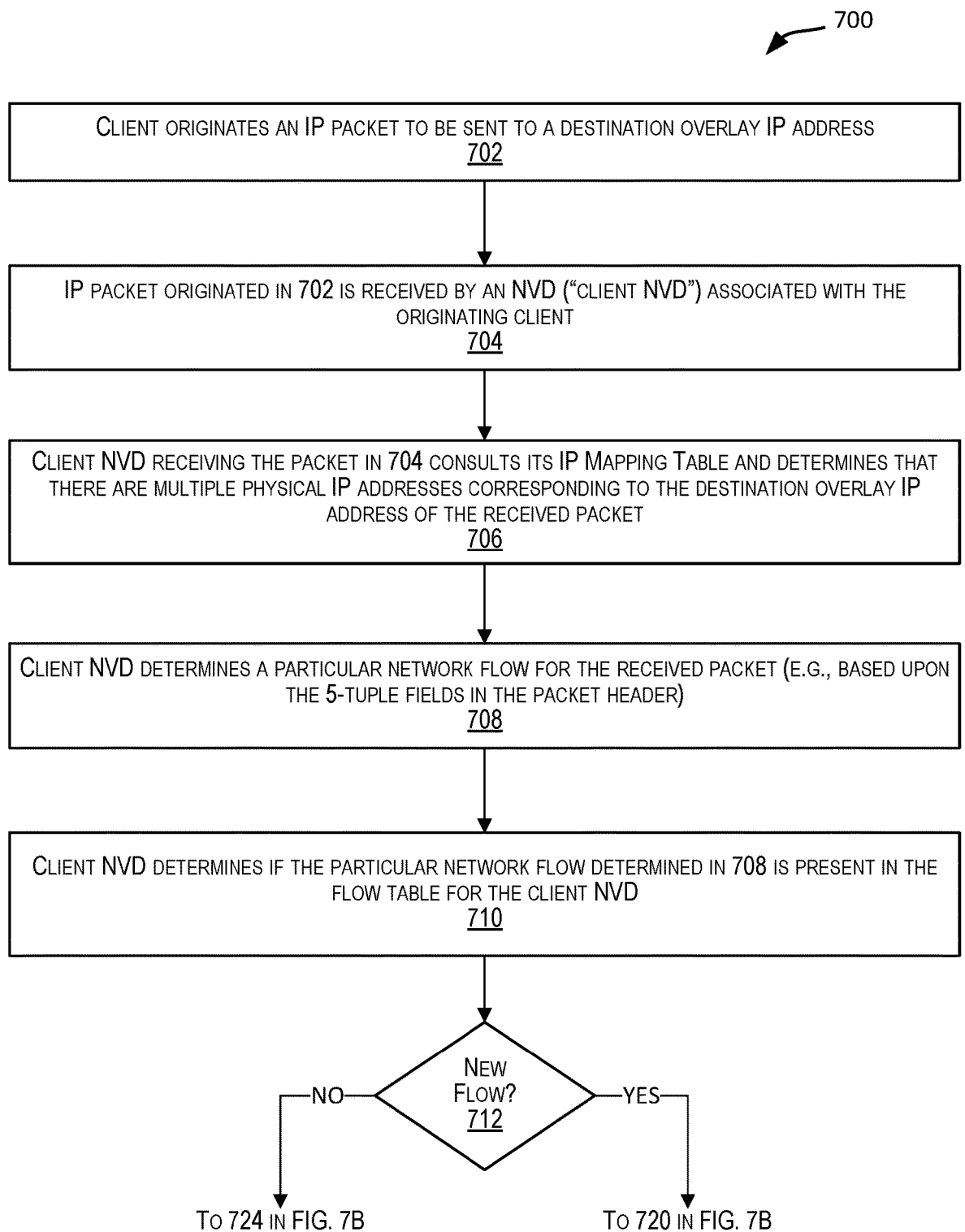
FIGS. 7A and 7B depict a simplified flowchart depicting processing performed for scaling an overlay IP address using a multi-attached IP address using stateful mode processing, according to certain embodiments.
Figure 7B:
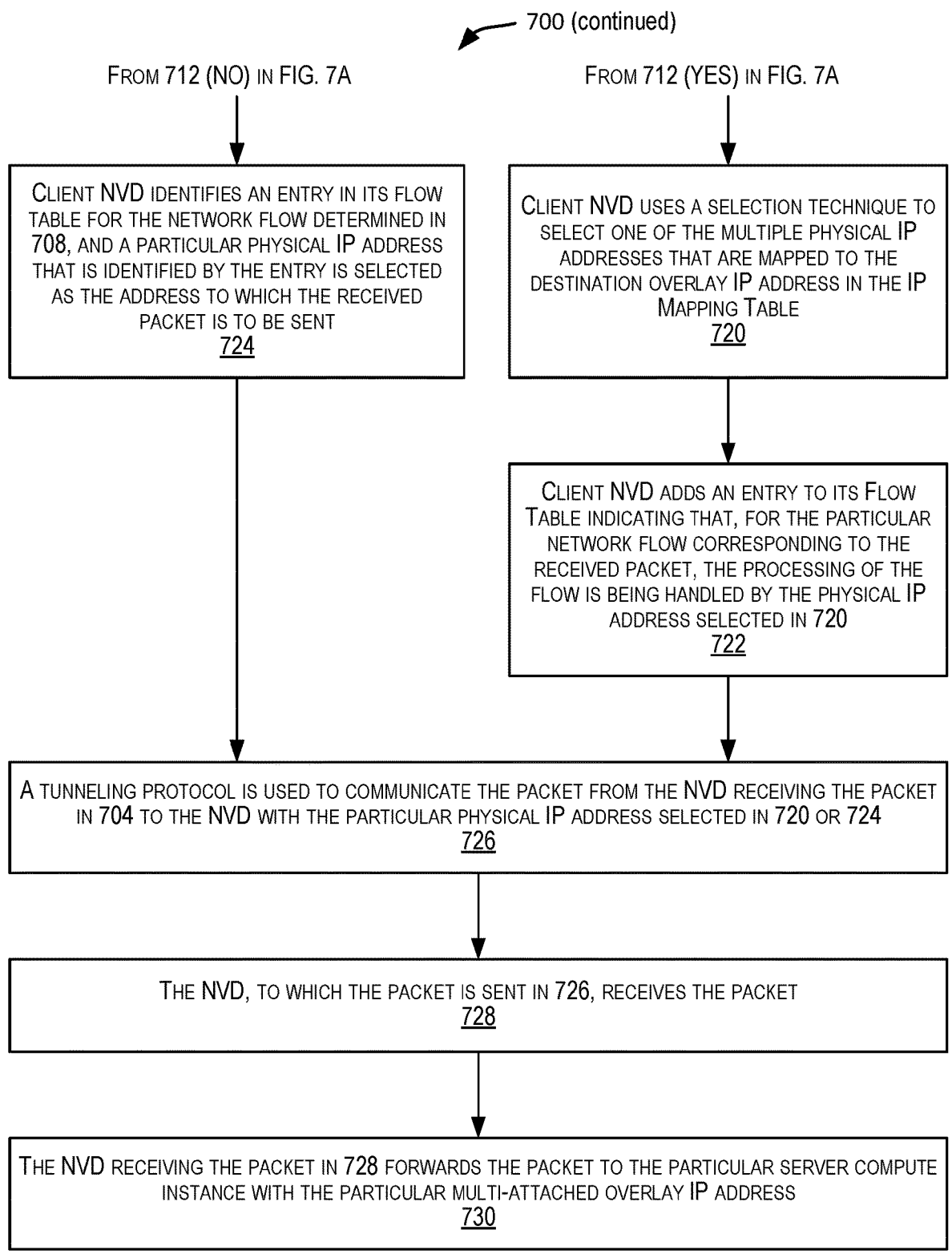
Figure 8:
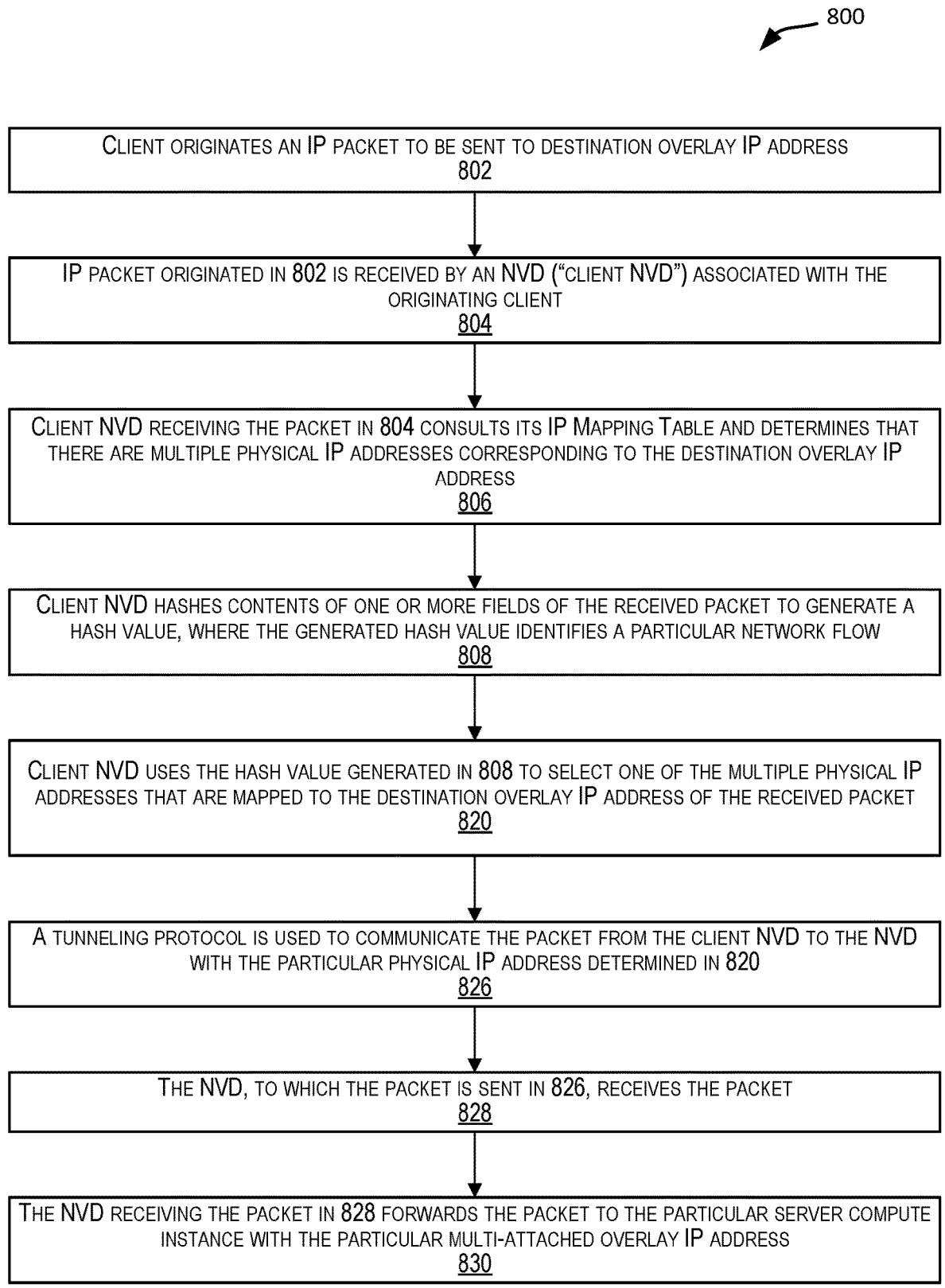
FIG. 8 depicts a simplified flowchart depicting processing for scaling an overlay IP address using a multi-attached IP address using stateless mode processing according to certain embodiments.

Processing involving multi-attached IP addresses can be performed in stateful mode or in stateless mode. FIG. 6A depicts a distributed cloud environment that implements scaling of an overlay IP address using a multi-attached IP address using stateful mode processing. FIGS. 7A and 7B depict a flowchart depicting processing performed for scaling a multi-attached IP address using stateful processing. FIG. 6B depicts a distributed cloud environment that implements scaling of an overlay IP address using a multi-attached IP address in stateless mode. FIG. 8 depicts a flowchart depicting processing for scaling of an overlay IP address using multi-attached IP addresses using stateless mode processing according to certain embodiments.

FIG. 6A shows an example of a distributed virtualized multitenant cloud environment 600 that may be hosted by CSPI provided by a cloud service provider (CSP) and which enables scaling of overlay IP addresses using multi-attached IP addresses in stateful mode processing without using load balancers according to certain embodiments. Distributed environment 600 comprises multiple systems that are communicatively coupled via physical network (substrate network) or switch fabric 610. Physical network 610 may comprise multiple networking devices, such as multiple switches, routers, etc. that enable communications using protocols such as Layer-3 communication protocols. In certain implementations, physical network 610 may be an n-tiered Clos network as depicted in FIG. 5 and described above. The value of "n" may be one, two, three, etc., depending upon the implementation.

Distributed environment 600 depicted in FIG. 6A is merely an example and is not intended to unduly limit the scope of claimed embodiments. Many variations, alternatives, and modifications are possible. For example, in some implementations, distributed environment 600 may have more or fewer systems or components than those shown in FIG. 6A, may combine two or more systems, or may have a different configuration or arrangement of systems. The systems, subsystems, and other components depicted in FIG. 6A may be implemented in software (e.g., code, instructions, program) executed by one or more processing units (e.g., processors, cores) of the respective systems, using hardware, or combinations thereof. The software may be stored on a non-transitory storage medium (e.g., on a memory device).

The various components depicted in FIG. 6A have IP addresses associated with them, where the IP addresses may be physical IP addresses or overlay IP addresses depending upon the component. In the figures, "P_IP" is used to denote a physical IP address and "O_IP" is used to denote an overlay IP address. These IP addresses may be IPv4 addresses (32-bit addresses), IPv6 addresses (128-bit addresses), or other types of IP addresses. In certain embodiments, the IP addresses may be expressed in the Classless Inter-Domain Routing (CIDR) IP address format. A CIDR address is composed of two numbers written in the format "X/Y" where prefix "X" is an IPv4 address (e.g., 10.10.10.1) and suffix "Y" (e.g., /12) indicates which part of the address (how many bits) are assigned to the network and are considered significant for network routing. For example, 192.180.0.0/23 indicates that 23 bits are used for the network portion.

As a use case, a customer of CSPI may provide a service (e.g., a cloud service) that is accessible by clients using a particular IP address endpoint. In the example depicted in FIG. 6A, it is assumed that the service is accessible using overlay IP address "B". Overlay IP address "B" may be an IPv4 address, an IPv6 address, or other type of IP address. For example, IP address B may be "10.10.10.1".

As shown in FIG. 6A, the customer has provided multiple compute instances 602-1 to 602-N for scaling and implementing the cloud service. A compute instance in compute instances 602-1 to 602-N can be a virtual machine compute instance or a bare metal compute instance. The same single overlay IP address "B" is associated with or attached to each of the multiple server compute instances 602-1 to 602-N. By enabling the same single overlay IP address "B" to be attached to multiple compute instances providing the service, the single IP address is scaled across the multiple service compute instances.

While in FIG. 6A and in the description below, compute instances 602-1 to 602-N are referred to as server compute instances, this is not intended to be limiting. A compute instance may function as a server when responding to a request from a client. The same compute instance may also function as a client when sending a request to another compute instance. Compute instances 602-1 to 602-N are referred to as server compute instances to simplify the description of the teachings described in this disclosure.

There are various ways in which a single overlay IP address can be attached to multiple server compute instances. As previously described, a compute instance participates in an overlay network (e.g., a customer VCN) via a VNIC configured for and associated with the compute instance. A VNIC can be part of a subnet of a VCN. In certain embodiments, multiple VNICs can be associated with the same compute instance, and these VNICs could be in different VCNs. In certain implementations, the single overlay IP address is attached to a compute instance by associating or attaching the single overlay IP address to a VNIC and associating that VNIC with the compute instance. For example, the customer may register the multiple server compute instances with the CSPI using, for example, a console provided by the CSPI, via command line interfaces, APIs, and the like. At the time of registration, for each compute instance in the multiple server compute instances, a VNIC may be configured and the single overlay IP address associated with the VNIC, and the VNIC may then be associated with the compute instance. In certain implementations, the customer may be allowed to specify the single overlay IP address (e.g., address "B") that is to be attached to the VNICs and to the multiple compute instances. In some other instances, the CSPI may automatically identify an overlay IP address to be used as the multi-attached IP address to be associated with VNICs and the compute instances.

For example, in the example depicted in FIG. 6A, server compute instance #1 602-1 may have an associated VNIC #1 and overlay IP address "B" is attached to VNIC #1, server compute instance #2 602-2 may have an associated VNIC #2 and IP address "B" is attached to VNIC #2, server compute instance #N 602-N may have an associated VNIC #N and IP address "B" is attached to VNIC #N, and so on. In this manner, the same overlay IP address is attached to multiple VNICs and to the multiple compute instances associated with the VNICs. A customer does not have to register all the server compute instances at the same time. The customer may add or remove server compute instances and associate them with VNICs attached to the multi-attached IP address as desired over time.

For a VNIC associated with a compute instance, functionality implementing the VNIC is executed by a network virtualization device (NVD) connected to a host machine hosting the compute instance. The NVD may execute software (e.g., software implementing network virtualization functions) that provides the VNIC functionality. For example, if the compute instance is a virtual machine instance hosted by a host machine, the VNIC functionality for a VNIC associated with the compute instance may be executed by an NVD connected to the host machine hosting the virtual machine compute instance. For example, as depicted in FIG. 2 and described above, for virtual machine compute instance 268 hosted by host machine 202, the VNIC functionality for VNIC 276 associated with the compute instance is executed by NVD 210 connected to host machine 202. As another example, in FIG. 2, bare metal instance 272 hosted by host machine 206 is associated with VNIC 280 that is executed by NVD 212 connected to host machine 206. For a compute instance whose VNIC functionality is executed by an NVD, the NVD is referred to as being associated with the compute instance or as being the NVD corresponding to the compute instance. For example, in FIG. 6A, NVD 604-1 is associated with server compute instance 602-1 and executes the functionality for the VNIC (VNIC #1) associated with compute instance 602-1, NVD 604-2 is associated with server compute instance #2 602-2 and executes the functionality for the VNIC (VNIC #2) associated with compute instance #2 602-2, and so on.

In the embodiment depicted in FIG. 6A, NVDs 604-1 to 604-N represent the NVDs that execute the VNIC-related functionality for VNICs configured for server compute instances 602-1 to 602-N. Each NVD associated with a compute instance has its own associated unique physical IP address that can be used to communicate with the NVD. For example, in FIG. 6A:

NVD-S #1 604-1 has a physical IP address "A.1" and executes the VNIC-related functionality for VNIC #1, which is the VNIC associated with server compute instance #1 602-1;

NVD-S #2 604-2 has a physical IP address "A.2" and executes the VNIC-related functionality for VNIC #2, which is the VNIC associated with server compute instance #2 602-2;

NVD-S #N 604-N has a physical IP address "A.N" and executes the VNIC-related functionality for VNIC #N, which is a VNIC associated with server compute instance #N 602-N;

and so on.

As previously described, an NVD executes software implementing a network virtualization stack that is responsible for performing various networking and virtualization related functions, such as, for example, executing VNICs-related functions. An NVD may be implemented in various forms, including as a smartNIC, as a Top-of-Rack (TOR switch), a smartTOR (a TOR with enhanced capabilities), a router, a switch, or a general purpose computer host running a network virtualization stack.

In certain embodiments, a VCN control plane 616 is responsible for configuring and managing overlay networks (e.g., VCNs) that are hosted by the CSPI. The VCN control plane 616 may store configuration information for VCNs for different customers. For example, the VCN control plane 616 may store mappings and associations between IP addresses and VNICs, between VNICs and compute instances, between VNICs and VCNs, and the like. The VCN control plane 616 may use this information to generate forwarding tables (e.g., Forwarding Table 1002 depicted in FIG. 10), mapping tables (e.g., IP Mapping Table 612 depicted in FIG. 6A), etc. that may be used by components of the CSPI for enabling communications between entities participating in overlay networks (e.g., VCNs) hosted by the CSPI. In certain embodiments, VCN control plane 616 is also responsible for storing mappings between the multi-attached IP address and its VNICs and multiple compute instances, mappings between the multi-attached IP address and physical IP addresses of NVDs associated with the multiple compute instances, and other mappings used for processing traffic to and from multi-attached IP addresses.

In the example depicted in FIG. 6A, a client 606 may initiate a request to access the service provided by the customer by sending a communication to IP address "B". The communication may be in the form of one or more packets that are originated at client 606 and have a destination IP address "B". The client 606 may be another compute instance such as a virtual machine compute instance or a bare metal compute instance, or some computing device. The use of the word "client" for a compute instance is not intended to be limiting. The same compute instance may also act as a server compute instance. In certain implementations, client 606 may itself be a compute instance having a multi-attached IP address.

An NVD associated with the client receives the request packet originated by the client. For example, in FIG. 6A, NVD 608 ("NVD-Client" 608) is associated with client 606 and may receive the packet sent by client 606. For example, NVD-Client 608 may be connected to a host machine hosting client instance 606 and may execute a network virtualization stack that implements VNIC-related functionality for the VNIC associated with client 606. In the example shown in FIG. 6A, client 606 has an associated overlay IP address (O_IP) "C" and NVD-Client 608 corresponding to client 606 has a physical IP address "D".

The processing performed by the various components in FIG. 6A for providing IP scaling using a multi-attached IP address in stateful mode is described below with reference to the flowcharts depicted in FIGS. 7A and 7B. FIGS. 7A and 7B depict a simplified flowchart 700 depicting processing performed for scaling an overlay IP address using a multi-attached IP address using stateful mode processing, according to certain embodiments. The processing depicted in FIGS. 7A and 7B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 7A and 7B and described below is intended to be illustrative and non-limiting. Although FIGS. 7A and 7B depict the various processing steps occurring in a particular sequence or order, this is not intended to be limiting. In certain alternative embodiments, the processing may be performed in some different order or some steps may also be performed in parallel.

The processing in flowchart 700 is performed using stateful mode processing, in which information about network flows (e.g., TCP network flow, UDP network flow) being processed by the NVDs is stored by the NVDs in associated Flow Tables (such as Flow Table 614 in FIG. 6A). The flow information is then used by the NVDs in selecting which one of the multiple compute instances associated with the multi-attached IP address is selected for receiving a packet. In stateful processing, once a particular compute instance attached to a multi-attached IP address has been selected for processing a packet belonging to a particular network flow, all subsequent packets belonging to that particular network flow are forwarded to that same particular compute instance for consistency of processing. The flowchart depicted in FIG. 8 shows processing performed in stateless mode. In a stateless mode, the flow information is not stored by the NVDs and thus not used for forwarding of packets. Stateful processing typically requires more processing and memory resources than stateless processing but may offer a richer set of capabilities than stateless processing.

Referring to FIG. 7A, processing is initiated in 702 when a client originates an IP packet that is to be sent to a particular destination overlay IP address. For example, in the embodiment depicted in FIG. 6A, the packet in 702 may be generated when client 606 requests access to the service accessible via overlay IP address "B". This results in an IP packet originated at client 606 and having a destination overlay IP address "B".

At 704, the IP packet generated in 702 is received by an NVD that is associated with the client and implements functionality for the VNIC associated with the client originating the packet. For example, in FIG. 6A, the packet is received by NVD-Client 608 connected to a host machine hosting client 606. In the embodiment depicted in FIG. 6A, NVD-Client 608 has a physical IP address "D".

At 706, the NVD receiving the IP packet in 704 consults its IP mapping table to determine how the received packet is to be forwarded. In the case where the destination IP address of the packet is a multi-attached IP address, the NVD determines in 706 that the destination IP address of the packet maps to multiple physical IP addresses of multiple NVDs. For example, in FIG. 6A, NVD-Client 608 may determine that the destination IP address of the packet received from client 606 is "B", and that, based upon information in its local IP Mapping Table 612, the overlay IP address "B" maps to multiple physical IP addresses A.1, A.2, A.3, A.4, . . . A.N.

In certain embodiments, information mapping overlay IP addresses to physical IP addresses of NVDs is maintained by the VCN control plane, such as by VCN control plane 616 depicted in FIG. 6A. The VCN control plane is responsible for generating the IP Mapping Table information and publishing it to the various NVDs in the overlay networks. For example, IP Mapping Table 612 depicted in FIG. 6A may be generated by VCN control plane 616 and published to NVD-Client 608 and other NVDs in the overlay network.

At 708, the NVD receiving the packet determines a particular network flow (e.g., TCP network flow, UDP network flow) corresponding to the receive packet. In certain implementations, the contents of certain fields from the received packet taken in combination define a network flow for the packet. For example, the contents of five fields (sometimes referred to as the 5-tuple) of the packet may be determined, and in combination define the network flow for the packet. In certain implementations, the five fields are a source IP address field, a source port field (e.g., specifying a Transmission Control Protocol (TCP) or User Datagram Protocol (UDP) port), a destination IP address, a destination port field (e.g., specifying a TCP or UDP port), and a protocol field (e.g., TCP is indicated by protocol number 6 (0x06), UDP is protocol number 17 (0x11). In other implementations, contents from a different set of fields (more than 5 fields, less than 5 fields, different 5 fields, etc.) of the packet may be taken together to determine a network flow for the packet.

At 710, the NVD performs processing to determine if the particular network flow determined in 708 is a new network flow or an existing network flow. In certain implementations, the NVD performs this by comparing the particular network flow determined in 708 to network flows identified in the NVD's flow table, where the NVD's flow table identifies network flows that have previously been handled or processed by the NVD. If the particular network flow determined in 708 is found in the flow table, then it indicates an existing network flow, else it indicates a new network flow. Based upon the processing performed in 710, at 712, a check is made to see if the particular network flow determined in 708 is a new or existing network flow and further processing continues based upon the results of the check. If the particular network flow is determined to be a new network flow (i.e., the particular network flow is not found in the flow table), then processing continues with 720 in FIG. 7B, else if the particular network flow is determined to already exist in the flow table, then processing continues with 724 in FIG. 7B.

For example, in the embodiment depicted in FIG. 6A, in 708, NVD-Client 608 may look at the combination of the contents of certain fields (e.g., the 5-tuple described above) of the received packet and determine a particular network flow for the received packet. NVD 608 may then, in 710, search Flow Table 614 to determine if the particular network flow determined in 708 is a new or existing network flow. In the example in FIG. 6A, Flow Table 614 indicates that TCP network flows TCP-Flow #1 (represented by a 5-tuple), TCP-Flow #2 (represented by a 5-tuple), and TCP-Flow #3 (represented by a 5-tuple) are existing network flows. Accordingly, if the particular network flow determined in 708 matches one of these three network flows (e.g., the 5-tuple of the received packet matches a 5-tuple in the Flow Table), then the received packet belongs to an existing network flow and processing continues with 724 in FIG. 7B, else the received packet belongs to a new network flow and processing continues with 720 in FIG. 7B.

Referring now to FIG. 7B, upon determining in 712 that the packet received by the NVD in 704 belongs to a new network flow, then at 720, the client NVD uses a selection technique to select one of the multiple physical IP addresses that are mapped to the destination overlay IP address of the packet. For example, in FIG. 6A, for overlay IP address "B", NVD 608 selects one of the multiple physical IP addresses A.1, A.2, . . . , A.N that are mapped to overlay IP address "B". Various different selection techniques may be used, such as a round-robin technique, a least-recently used technique, randomized techniques, or other techniques. In certain implementations, the selection technique may first generate a hash value by hashing the contents of certain fields of the received packet and then determine a particular physical IP address from among the multiple physical IP addresses mapped to the overlay IP address based upon the generated hash value. For example, the hashing may include generating a value based upon the contents of the fields and then applying a modulo function using the value "N", where "N" is the number of physical IP addresses that map to the overlay IP address. The resultant hash value may point or index to a particular physical IP address from the multiple physical IP addresses and that particular physical IP address is selected in 720. In certain embodiments, the goal of the selection technique is to evenly distribute traffic directed to the multi-attached overlay IP address across the multiple server compute instances that are attached to the multi-attached overlay IP address.

At 722, the NVD may add an entry referencing the particular network flow determined in 708 to its flow table. This added entry may also indicate that, for the particular network flow determined in 708, the physical IP address selected in 720 was selected for processing packets belonging to this network flow. This entry in the flow table may then be used for subsequent packets belonging to that particular network flow and enables subsequent packets belonging to the network flow to be sent to the same physical IP address, and thus to the same server compute instance for handling. In this manner, the infrastructure ensures that packets belonging to a network flow land at and are handled by the same server compute instance. Processing then continues with 726, as described below.

For example, for the embodiment depicted in FIG. 6A, assume that the particular network flow determined for the received packet is TCP-Flow #4. NVD-Client 608 determines based upon the processing in 710 and 712 that this network flow is not found in Flow Table 614 and thus the received packet belongs to a new network flow. NVD-Client 608 then selects one physical IP address from among addresses A.1, A.2, A.3 . . . A.N. As an example, let's assume that physical IP address A.2 is selected. NVD-Client 608 may then add an entry to Flow Table 614 referencing TCP-Flow #4 and further indicating that physical IP address A.2 has been selected for processing packets belonging to this network flow. For example, the entry "TCP-Flow #4-A.2" may be added to Flow Table 614 in 722.

If it is determined in 712 that the packet received by the NVD in 704 belongs to an existing network flow, then at 724, the NVD identifies an entry in its flow table for the particular network flow determined in 708, and a particular physical IP address that is identified by that entry is selected as the address to which the packet is to be sent. This particular physical IP address is the address of an NVD associated with a particular server compute instance from the multiple server compute instances attached to the same overlay IP address. In essence, in 724, by selecting a particular physical IP address for an NVD, a particular server compute instance is selected to which the packet is to be sent and this server compute instance is one that is already handling the particular network flow to which the received packet belongs. For example, in FIG. 6, NVD-Client 608 may determine that the received packet belongs to network flow "TCP-Flow #2" identified in Flow Table 614, and the physical IP address "A.2" is then selected as the address to which the received packet is to be sent.

At 726, a tunneling protocol is used to communicate the packet from the NVD receiving the packet in 704 to the NVD associated with the physical IP address selected in 720 or 724. Various different tunneling protocols may be used such as IP-in-IP (or Generic Routing Encapsulation (GRE)), Virtual Extensible LAN (VxLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others. Tunneling typically involves encapsulating the received packet in one or more headers and the information in the headers is used to communicate the packet from the sending NVD to the receiving NVD via physical network 610. Tunneling in a virtualized network enables traffic to be communicated from one end point (e.g., the NVD sending a packet) to another end point (e.g., the NVD receiving the packet) without making any changes to the original packet received by the sending NVD and unbounded by the broadcast domain or the physical network. Processing related to encapsulating the packet is performed by the sending NVD. For example, in FIG. 6A, the packet encapsulation is performed by NVD-Client 608. For example, if it is determined that the received packet belongs to network flow "TCP-Flow #2" and is to be sent to physical IP address A.2, then a tunneling protocol is used to communicate the packet from NVD-Client 608 to NVD-S #2 604-2 associated with physical IP address A.2.

At 728, the NVD associated with the physical IP address to which the packet was sent in 726 receives the packet. For example, if the packet was sent to physical IP address A.2, then NVD-S #2 604-2 receives the packet. At 730, the NVD receiving the packet in 728 then forwards the packet to a server compute instance associated with the receiving NVD and having the multi-attached overlay IP address as its IP address. For example, in FIG. 6A, NVD 604-2 forwards the packet to server compute instance #2 602-2 that is associated with overlay IP address "B".

The processing depicted in FIGS. 7A and 7B and described above can be performed for packets destined for the multi-attached overlay IP address (e.g., overlay IP address "B"), where the packets originate from one or more clients. The NVD that is connected to the host machine hosting a client that originates the packet is configured to perform processing to determine which one of the multiple NVDs associated with the multiple compute instances attached to the multi-attached IP address will receive the packet for processing. The NVD is, in essence, selecting a particular compute instance for receiving the packet from among the multiple compute instances attached to the multi-attached IP address. Different ones of the multiple compute instances may be selected at different times for the packets addressed to the multi-attached IP address. For example, a packet belonging to a first network flow may be sent to compute instance #1, a packet belonging to a second network flow may be sent to compute instance #2, a packet belonging to a third network flow may be sent to compute instance #3, and so on. In this manner, the packets sent to the multi-attached IP address are distributed across the multiple server compute instances, and all this is achieved without using any load balancers or any complicated routing tables.

In certain embodiments, the functions depicted in FIGS. 7A and 7B that are performed by the NVDs (e.g., by NVD-Client 608 and NVDs 604) are implemented using software executed by one or more processors of the NVDs. For example, an NVD may execute a network stack software that implements the various functions described in this disclosure.

As indicated above, FIGS. 7A and 7B depict processing performed in a stateful mode where a flow table is maintained by the NVDs showing existing flows and information in the flow table is used to determine how a packet is to be forwarded. Packets belonging to a particular network flow are sent to and handled by the same server compute instance. However, stateful processing takes extra processing and resources (e.g., memory for storing the flow table, extra processing needed for checking the flow table information, etc.) than stateless processing.

FIG. 6B shows an example of a distributed virtualized multitenant cloud environment 650 that may be hosted by CSPI provided by a cloud service provider (CSP) and which enables scaling of overlay IP addresses using multi-attached IP addresses in stateless mode processing without using load balancers according to certain embodiments. Distributed environment 650 is very similar to distributed environment 600 depicted in FIG. 6A and similar components in FIG. 6B are labeled using the same reference numbers as in FIG. 6A. In FIG. 6B, there is however no flow table. The NVDs do not store any flow table, and hence the processing is referred to as stateless.

FIG. 8 depicts a simplified flowchart 800 depicting processing for scaling an overlay IP address using a multi-attached IP address using stateless mode processing according to certain embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order or some steps may also be performed in parallel.

The processing in 802, 804, and 806 is similar to the processing performed in 702, 704, and 706, respectively, depicted in FIG. 7A and described above. At 808, a hash value is generated for the received packet. Various different hashing techniques may be used in 808. In certain implementations, a hash value is generated using the contents of one or more fields of the received packet. For example, the contents of the source IP address field, the source port field, the destination IP address field, the destination port field, and the protocol field of the received packet may be used to generate an initial value and then a modulo "N" function may be applied to the initial value to generate a final hash value, where "N" is the number of physical IP addresses that map to the multi-attached overlay IP address. In other implementations, contents from a different set of fields (more than 5 fields, less than 5 fields, different 5 fields, etc.) of the packet may be use to generate the hash value. In certain implementations, a consistent hashing technique is used. A consistent hashing technique minimizes the impact of hashing disruptions in situations where server compute instances are added to or removed from the pool of server compute instances attached to the multi-attached IP address.

At 820, the client NVD uses the hash value generated in 808 to select a particular physical IP address from the multiple physical IP addresses that are mapped to the same destination overlay IP address of the packet. In certain implementations, the hash value generated in 808 acts as an index to a particular single physical IP address from the multiple physical IP addresses mapped to the multi-attached IP address.

At 826, a tunneling protocol is used to communicate the packet from the NVD receiving the packet in 804 to the NVD associated with the physical IP address selected in 820.

Processing in 820 is similar to the processing in 720 in FIG. 7B and described above. The processing in 828 and 830 is similar to the processing in 728 and 730 in FIG. 7B as described above, and the packet is forwarded to the server compute instance associated with the NVD to which the packet is sent in 826.

Stateless processing typically requires less memory resources than stateful processing since a flow table is not stored or used by the NVDs. Stateless processing also typically requires fewer processing steps than stateful processing since the flow table-related processing is not performed. As a result, in certain implementations, stateless processing tends to be faster than stateful processing.

As in stateful processing, in stateless processing, packets belonging to a particular network flow are sent to the same NVD (i.e., the same physical IP address is selected) and thus to the same server compute instance for processing. This is because, as part of the hashing, the initial value that is generated based upon the contents of one or more fields of the received packet uniquely identifies the network flow to which the packet belongs, and when the modulo function is applied to this initial value, the resultant hash value maps or hashes to the same physical IP address.

As previously indicated, in a situation where a number of compute instances are sitting behind a load balancer, an external client can send packets to one or more the compute instances, but the compute instances sitting behind the load balancer cannot initiate new connections or communications with the client. Accordingly, with conventional load balancers, connections to compute instances sitting behind a load balancer have to be externally initiated, but instances sitting behind the load balancer cannot initiate connections to external clients. The novel architecture described herein overcomes this limitation. As described above, a client can initiate a new communication or connection with a server compute instance that is attached to a multi-attached IP address. The server compute instance receiving a client initiated communication can respond to the client-initiated communication by sending one or more response packets to the client. Additionally, a server compute instance attached to a multi-attached IP address can also initiate a new communication or connection with one or more clients, where the new communication or connection request is not in response to a previous communication from a client. The NVDs are configured to ensure that, for communications initiated by a server compute instance attached to a multi-attached IP address, the packet is properly communicated to the intended client recipient. Processing is also performed that enables a client receiving a new connection or communication from a server compute instance attached to a multi-attached IP address to be able to respond to that server compute instance-initiated communication and the client's response (e.g., client originated response packet) is properly forwarded to the correct particular server compute instance that initiated the client communication. Accordingly, a client can initiate a communication with a server compute instance using the multi-attached IP address, and a server compute instance attached to the multi-attached IP address can also initiate connections or communications (by sending packets) with a client.

For example, in FIG. 6A or 6B, the service that is accessed using the multi-attached IP address "B" may want to push data out to one or more clients. Using the teachings disclosed in this disclosure, any of the multiple server compute instances 602-1 to 602-N associated with the multi-attached overlay IP address "B" can initiate new connections and push data out to clients. The clients receiving these server compute instance-initiated communications can respond to the communications and the responses are forwarded properly to the particular server compute instance that initiated the communication.

Figure 9A:
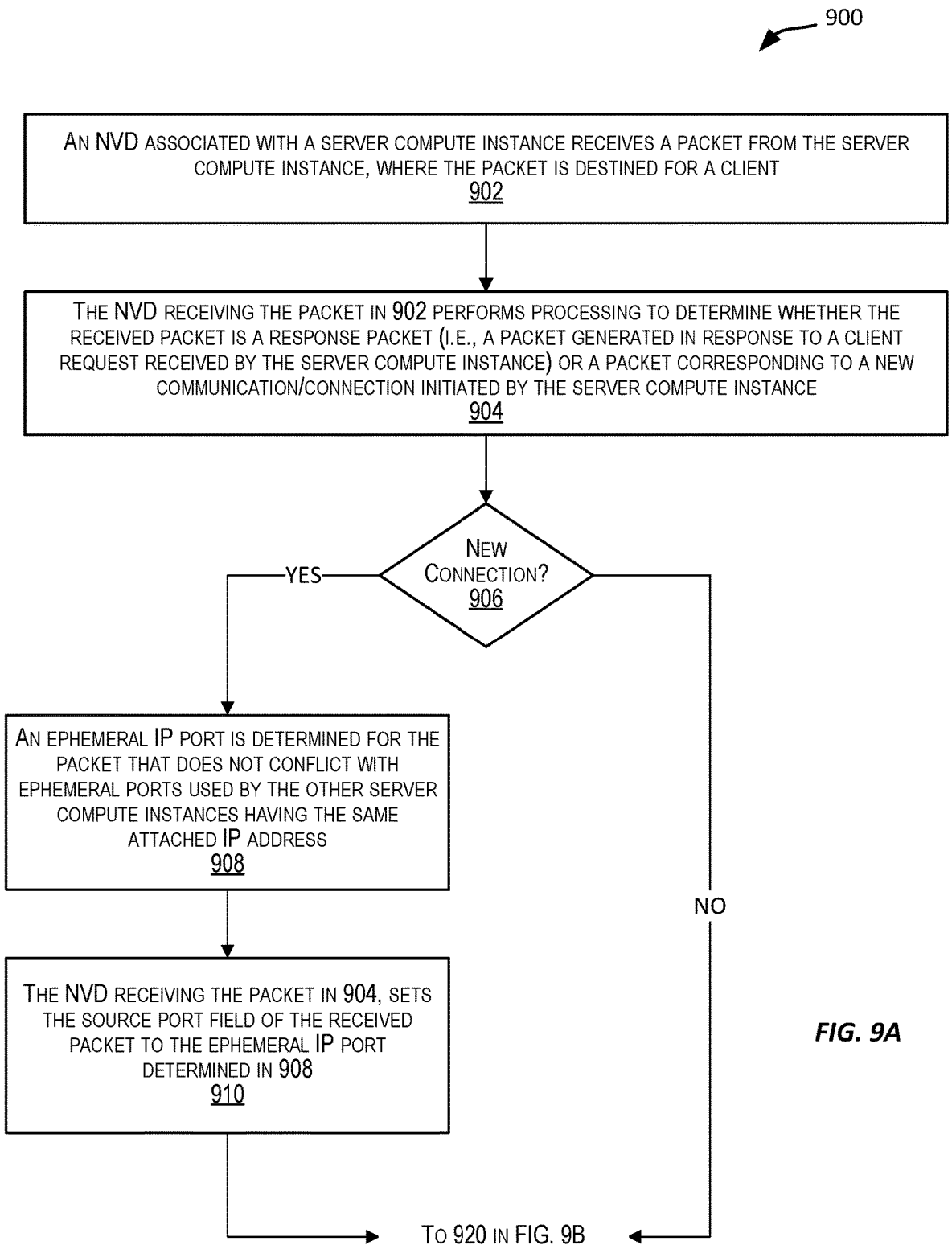
FIGS. 9A and 9B depict a simplified flowchart depicting processing for enabling communications from a server compute instance attached to a multi-attached IP address to one or more clients according to certain embodiments.
Figure 9B:
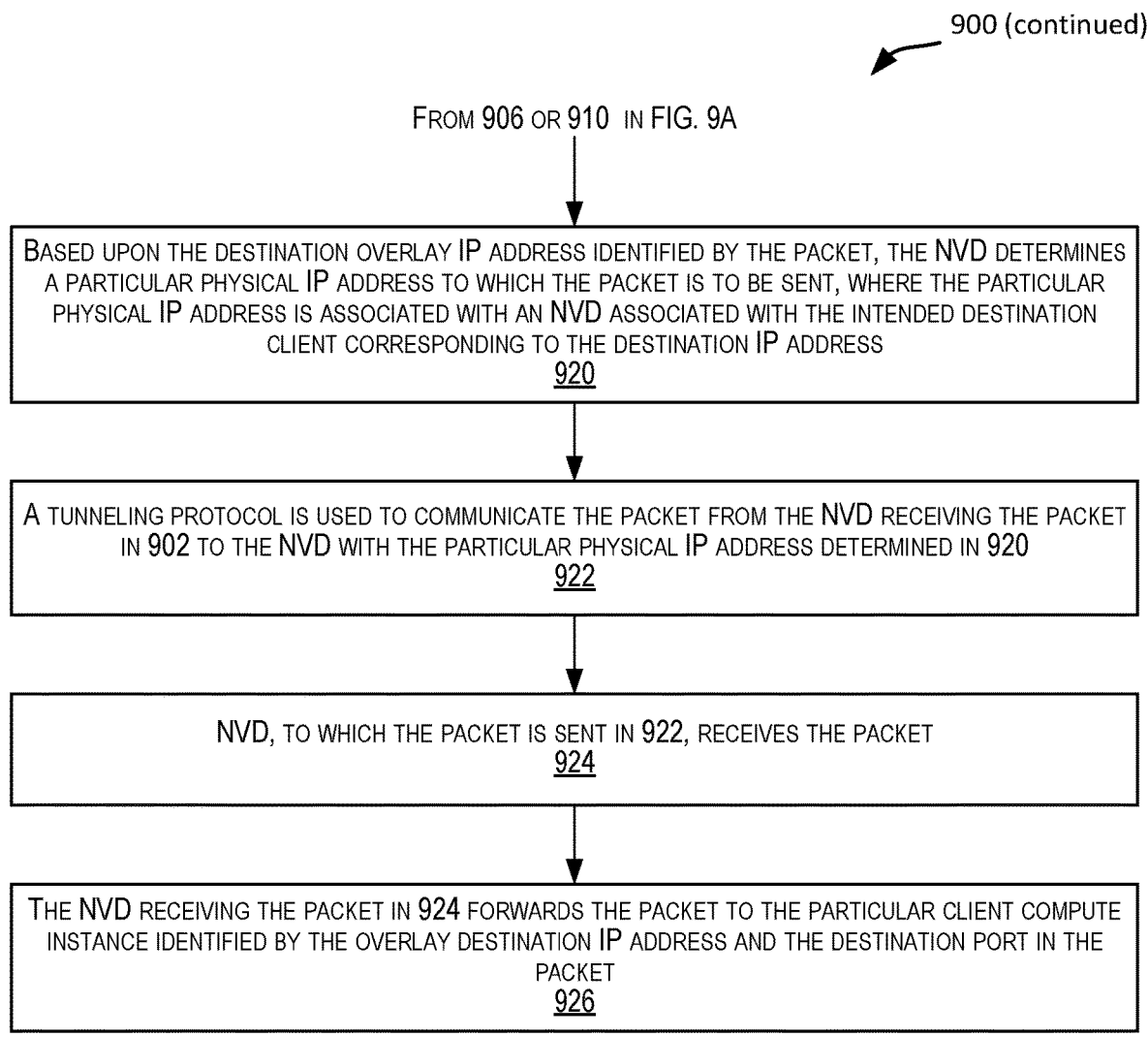

FIGS. 9A and 9B depict a simplified flowchart 900 depicting processing for enabling communications from a server compute instance attached to a multi-attached IP address to one or more clients according to certain embodiments. The processing depicted in FIGS. 9A and 9B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 9A and 9B and described below is intended to be illustrative and non-limiting. Although FIGS. 9A and 9B depict the various processing steps occurring in a particular sequence or order, this is not intended to be limiting. In certain alternative embodiments, the processing may be performed in some different order or some steps may also be performed in parallel.

As shown in FIG. 9A, processing is initiated, at 902, when an NVD associated with a server compute instance receives an IP packet originated by the server compute instance and the packet indicates a destination overlay IP address corresponding to a client. For example, in the embodiments in FIG. 6A or 6B, NVD-S #2 604-2 may receive a packet from server compute instance #2 602-2 and the packet may be directed to client 606 (i.e., the destination IP address of the packet is the overlay IP address "C" of client 606.

The packet includes various fields specifying a source IP address, a source port (e.g., specifying a Transmission Control Protocol (TCP) or User Datagram Protocol (UDP) port), a destination IP address, a destination port (e.g., specifying a TCP or UDP port), and a protocol (e.g., TCP is indicated by protocol number 6 (0x06), UDP is protocol number 17 (0x11)), and other fields. The destination IP address field may contain an overlay IP address of the intended recipient or destination of the packet. The destination port field may contain a port number corresponding to a port of the destination client. The source IP address field may contain the overlay IP address (i.e., the multi-attached overlay IP address) of the server compute instance sending the packet. The source port field identifies a port associated with the server compute instance. The protocol field may specify a number identifying the protocol (e.g., TCP, UDP) being used. Since the multiple server compute instances have the same overlay IP address, this field value will be the same for packets originating from each of the multiple compute instances attached to the multi-attached IP address. The source port field may be blank or may include a port number associated with the server compute instance sending the packet.

At 904, the NVD receiving the packet performs processing to determine whether the packet received in 902 is a response packet or a packet for initiating a new connection or communication between the server compute instance sending the packet and the destination client. A response packet is a packet that is sent by the server compute instance to a destination client as part of an existing communication or connection between the destination client and the server compute instance. A response packet is a packet sent in response to a packet previously communicated from the destination client to the server compute instance.

The NVD may use various techniques to determine if the packet received in 902 is a response packet or a packet corresponding to a new server compute instance-initiated communication. According to one technique, the determination can be made based upon the communication protocol used for communicating the packet. For many communication protocols, the contents of a packet for initiating a new connection are different from a packet that is part of an existing connection or flow. For such communication protocols, the NVD can determine if the received packet is a response packet or a packet initiating a new connection or communication by examining the contents of the packet. For example, for TCP, the protocol itself differentiates between response packets and new connection packets. If the packet is a bare SYN packet, then it is a packet for establishing a new connection. If the packet is a SYN packet with an ACK inside it, then it is a packet generated in a communication session that has already started and is thus a response packet. The presence of the acknowledgement (ACK) indicates that the packet is a response packet.

According to another technique, in certain implementations. the NVD associated with the server compute instance may maintain a flow table for packets that are inbound to the server compute instance. For example, in FIG. 6A, for packets received by NVD 604-1 and that are forwarded by the NVD to server compute instance 602-1, NVD 604-1 may store flow information for those packets. If the packet received in 902 from the server compute instance is a "reverse" of a flow already in the flow table, then the packet is identified as a response packet, else it is identified as a new connection packet.

According to yet another technique, in certain implementations, if the packet received in 902 has a source port value that is a well-known service port (e.g., port 80) and is not an ephemeral source port, then the packet is identified as a response packet. Alternatively, if the packet received in 902 has a source port that is an ephemeral source port, then the packet is identified as a new connection packet, else a response packet.

Based upon the processing performed in 904, in 906, a check is made to see if the received packet is new connection packet or a response packet. If it is a new connection/communication packet then processing continues with 908, else processing proceeds with 920 in FIG. 9B. If the packet is determined to be a new connection packet, then special processing is performed to set a value for the source port field of the packet.

Generally, for a packet, the combination of the source IP address of the packet and the source port of the packet uniquely identifies a sender of the packet. In the present case where the same overlay IP address is attached to multiple server compute instances, the source IP address for packets originating from each of these server compute instances will have the same source IP address, i.e., the multi-attached overlay IP address. For example, in FIG. 6A, packets originating each of server compute instances 602-1 to 602-N will have the same source IP address, namely, overlay IP address "B". Further, the source ports for packets originating from the different server compute instances may also conflict with each other, i.e., may be the same, thus leading to the situation where two packets sent by two different server compute instances both have the same source IP and source port values. In such a situation, it is very difficult to uniquely identify the senders of the packets. Accordingly, without doing special processing, for packets originating from two or more different server compute instances attached to the multi-attached overlay IP address, the combination of the source IP address and source port may not uniquely identify the sender of the packet. This creates problems, especially if the recipient of the packet (e.g. the client to whom the packet is directed) wants to respond to the sending server compute instance—there is no way to identify which one of the multiple server compute instances with the multi-attached IP address sent the packet and thus should receive the response from the client. In order to overcome this technical problem of source port space collision when the same IP address lives on multiple compute instances in a virtual network, special processing is performed in 908 and 910 to ensure that source port for the packet does not conflict with source ports for packets emanating from the other server compute instances attached to the same overlay IP address. The processing performed in 908 and 910 ensures that the combination of the source IP and the source port is unique across the multiple server compute instances attached to the multi-attached IP address and thus uniquely identifies a particular server compute instance that is the sender of the packet.

At 908, an ephemeral port value is determined for the packet that is unique and does not conflict with ephemeral port values used by the other server compute instances having the multi-attached overlay IP address. Several different techniques may be used to perform the processing in 908.

In certain implementations, a static port sharding technique may be used. According to this technique, the available ephemeral source port space is divided between the different compute instances with the multi-attached IP address, with each server compute instance being allocated a range of ephemeral source port values that does not overlap with ranges allocated to the other server compute instance with the multi-attached IP address. The ephemeral source port values allocated to a particular server compute instance are different from and do not conflict with ephemeral source port values allocated to other compute instances that have the same attached overlay IP address.

For example, if 16 bits are used to specify a source port, of which "X" ports are ephemeral ports. The X ephemeral port values may be divided between the various compute instances attached to the multi-attached IP address. For example, if there are 48K ephemeral port values, then port values 0 to 10K may be allocated to the first compute instance, port values 10,001 to 20K may be allocated to the second compute instance, port values 20,001 to 40K may be allocated to a third compute instance, and so on. By performing such disjoint and non-overlapping allocations, collisions of ephemeral port values for packets sent from two different compute instances with the same attached IP address is avoided. Since the ephemeral ports range allocated to the different compute instances are non-overlapping, collisions are avoided.

As part of 908, for a packet received from a particular server compute instance, the NVD receiving the packet a range of ephemeral port values allocated to that particular server compute instance is identified, and a particular ephemeral port value from the identified range is selected for that packet. For example, in FIG. 6A or 6B, NVD-S #2 604-2 may receive a new connection packet from server compute instance #2 602-2. NVD-S #2 604-2 may then determine a range of ephemeral port values allocated to server compute instance #2 602-2, and then select a particular ephemeral port value from the identified range in 908.

In certain implementations, the allocation of the different ranges may be left to the customer to enforce. In some other implementations, components of the CSPI (e.g., the VCN control plane) may control the allocations and distribute the allocations to the NVDs, which may then enforce the ranges. For example, upon receiving a packet, the NVD may determine the range of ephemeral port values allocated to the originating compute instance and select a port value from this range in 908 to be used as the source port value for the packet.

In some other implementations, a service ("ephemeral port service") may be provided by CSPI that is responsible for ensuring that the selected ephemeral ports do not conflict. The service may have access to a database that stores a set of ephemeral port values that can be allocated for multiple compute instances with a multi-attached IP address. The database may be maintained by the VCN control plane and may be shared between the multiple compute instances attached to the multi-attached IP address. When an NVD receives a packet from a particular server compute instance with a multi-attached IP address, the NVD may send a request to this service requesting a lease on a set of ephemeral ports for a certain period of time. Using the information stored in the database, the service may respond by allocating one or more ports to the requester while ensuring that the allocated ports are not being used by any other compute instance with the multi-attached IP address. Additionally, the service may ensure that ports that are already allocated to a server compute instance are not allocated to other requesting NVDs for processing packets from other compute instances with the same attached IP address. This technique enables sharding of ports to be performed in a dynamic manner. A shared database is one way of implementing this dynamic sharding technique. In other embodiments, other techniques may be used such as an in-memory distributed data store, and the like.

In some other implementations, the customer may be tasked with ensuring uniqueness of source ports for packets originating from compute instances with the same attached overlay IP address.

At 910, the source port field of the packet is set to the ephemeral port value identified in 908. In certain implementations, the packet received in 902 may already have a value in its source port field. If the port value determined in 908 is different from the already existing value, port address translation (PAT) is performed and the existing value is replaced with the port value determined in 908. The processing performed in 908 and 910 ensures that for all traffic that is sent outbound from compute instances attached to the same IP address, the combination of the source IP address and the source port uniquely identifies the particular compute instance from the multiple compute instances. Processing then continues with 920 in FIG. 9B.

At 920, the NVD receiving the packet in 902 from the server compute instance, based upon the destination IP address of packet (where the destination IP address identifies the intended client recipient of the packet), determines a particular physical IP address to which the packet is to be sent. The particular physical IP address may be determined from a routing table stored by the NVD that maps the destination overlay IP address of the client to the physical IP address. The particular physical IP address may be an address of an NVD associated with the intended client recipient. For example, in FIG. 6A or 6B, if the intended destination of the packet is client 606, and the destination IP field of the packet identifies overlay IP address "C", then in 920, determines the physical IP address ("D") of NVD 608 associated with client 606.

In certain implementations, if the packet is a response packet corresponding to a particular network flow, the NVD may maintain a flow table corresponding to traffic flows handled by that NVD that are inbound to the server compute instance. For each such flow, the flow table information may identify the physical IP address from which the traffic flow was received. In the outbound direction from the server compute instance, the NVD may determine a network flow to which the packet belongs, identify this flow in the flow table, and then use the flow information for this network flow to determine a particular physical IP address that was the source of the packets that were inbound to the compute instance. This particular physical IP address is then identified as the IP address to which the packet outbound from the server compute instance is to be sent. In some other implementations, the NVD may have an IP mapping table that maps overlay IP addresses to physical IP addresses and may determine the particular physical IP address from this mapping table. In yet other implementations, the NVD may use a forwarding or routing table that provides next hop path information for the destination of the outbound packet and determine the next hop physical IP address. For example, the NVD may do a lookup in the routing table to identify the physical IP address of the next hop.

At 922, a tunneling protocol is used to communicate the packet from the NVD receiving the packet in 902 to the NVD associated with the physical IP address determined in 920. Various different tunneling protocols may be used such as IP-in-IP (or Generic Routing Encapsulation (GRE)), Virtual Extensible LAN (VxLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others. Tunneling typically involves encapsulating the received packet in one or more headers and the information in the headers is used to communicate the packet from the sending NVD to the receiving NVD via physical network 610. Tunneling in a virtualized network enables traffic to be communicated from one end point (e.g., the NVD sending a packet) to another end point (e.g., the NVD receiving the packet) without making any changes to the original packet received by the sending NVD and unbounded by the broadcast domain or the physical network. Processing related to encapsulating the packet are performed by the sending NVD. For example, in FIG. 6A or 6B, for a packet received by NVD-S #2 604-2 from compute instance #2 602-2, the packet encapsulation is performed by NVD-S #2 604-2. If it is determined that the packet is to be sent to physical IP address "D" of NVD 608, then a tunneling protocol is used to communicate the packet from NVD 604-2 to NVD-Client 606 associated with physical IP address "D".

At 924, the NVD associated with the physical IP address to which the packet was sent in 922 receives the packet. For example, if the packet was sent to physical IP address "D", then NVD-Client 608 receives the packet. At 926, the NVD receiving the packet in 924 then forwards the packet to the intended client recipient. For example, in FIG. 6A, NVD 608 forwards the packet to client 606. Since the packet received by the client has a unique source IP address and source port combination, the client can respond to the packet received from the server compute instance and the client's response packet is properly forwarded to the correct particular server compute instance sending the packet, even though the particular server compute instance is attached to a multi-attached IP address.

As described above, an overlay IP address can be attached to multiple compute instances. In certain implementations this is done by attaching the same overlay IP to multiple VNICs, and the overlay IP address consequently becomes attached to the compute instances associated with the VNICs. Components in the overlay networks are configured such that the multi-attached IP address can be used to distribute traffic across the multiple compute instances attached to that multi-attached IP address, and all this is achieved without using any load balancers, load balancing services, or any complicated routing tables. As a result, the complexities and the latencies introduced by the use load balancers are avoided. The distribution of packets directed to a multi-attached IP address is transparent to the customer providing the multiple server compute instances to which the IP address is attached. The architecture also provides a lot of flexibility in that processing can be done using stateful or stateless methods, using various different hashing techniques, including consistent hashing techniques, and the like.

A client can initiate a new communication or connection with a server compute instance that is attached to a multi-attached IP address by sending packets to the multi-attached IP address. A server compute instance receiving a client initiated communication can respond to the client-initiated communication by sending one or more response packets to the client. Additionally, a server compute instance attached to a multi-attached IP address can also initiate a new communication or connection with one or more clients, where the new communication or connection request is not in response to a previous communication from a client. A client receiving a server compute instance-initiated communication can respond to the communication and the response is properly forwarded to the particular server compute instance that initiated the communication.

From the customer's perspective, a single overlay IP address is automatically attached with multiple VNICs and with the compute instances associated with the VNICs and traffic destined for the multi-attached IP address is transparently distributed across the multiple compute instances. Further, the IP address that is attached to the multiple interfaces and compute instances is scaled without using any load balancers or without leveraging any explicit service that provides load balancing functionality, and without the customer having to make any changes to their compute instances or applications. The costs and technical complexities associated with load balancers are avoided. The customer can host a service behind the multi-attached IP address and the IP address can be scaled across multiple compute instances in a manner that makes the IP address highly available and infinitely scalable, as desired by the customer depending upon how much traffic and how many connections each server compute instance should or is expected to handle. This scalability enables the customer to provide the service to a large number of clients and be able to scale, either up or down, very easily by just adding or removing one or more compute instances and attaching the same multi-attached IP address to the compute instances, and all this is achieved without being dependent upon load balancers or complicated traffic distribution schemes.

Equal Cost MultiPath (ECMP) in Overlay Networks

As described above, an overlay IP address may be scaled in virtual networks by attaching the overlay IP address with multiple VNICs that are associated with multiple compute instances, and without using any load balancer or complicated routing techniques. In certain implementations, an IP may also be scaled in a virtual networking environment using ECMP techniques in the overlay networks.

In a traditional physical networking environment, ECMP is a routing strategy that routes traffic between the same sender and receiver (e.g., for the same connection or session) across multiple paths of equal cost. This allows traffic to be load balanced across the multiple paths and thus provides for better utilization of available bandwidth. In certain embodiments, as described herein, ECMP techniques are used in the virtualized networking environment (e.g., in overlay networks) to scale IP addresses.

Figure 10:
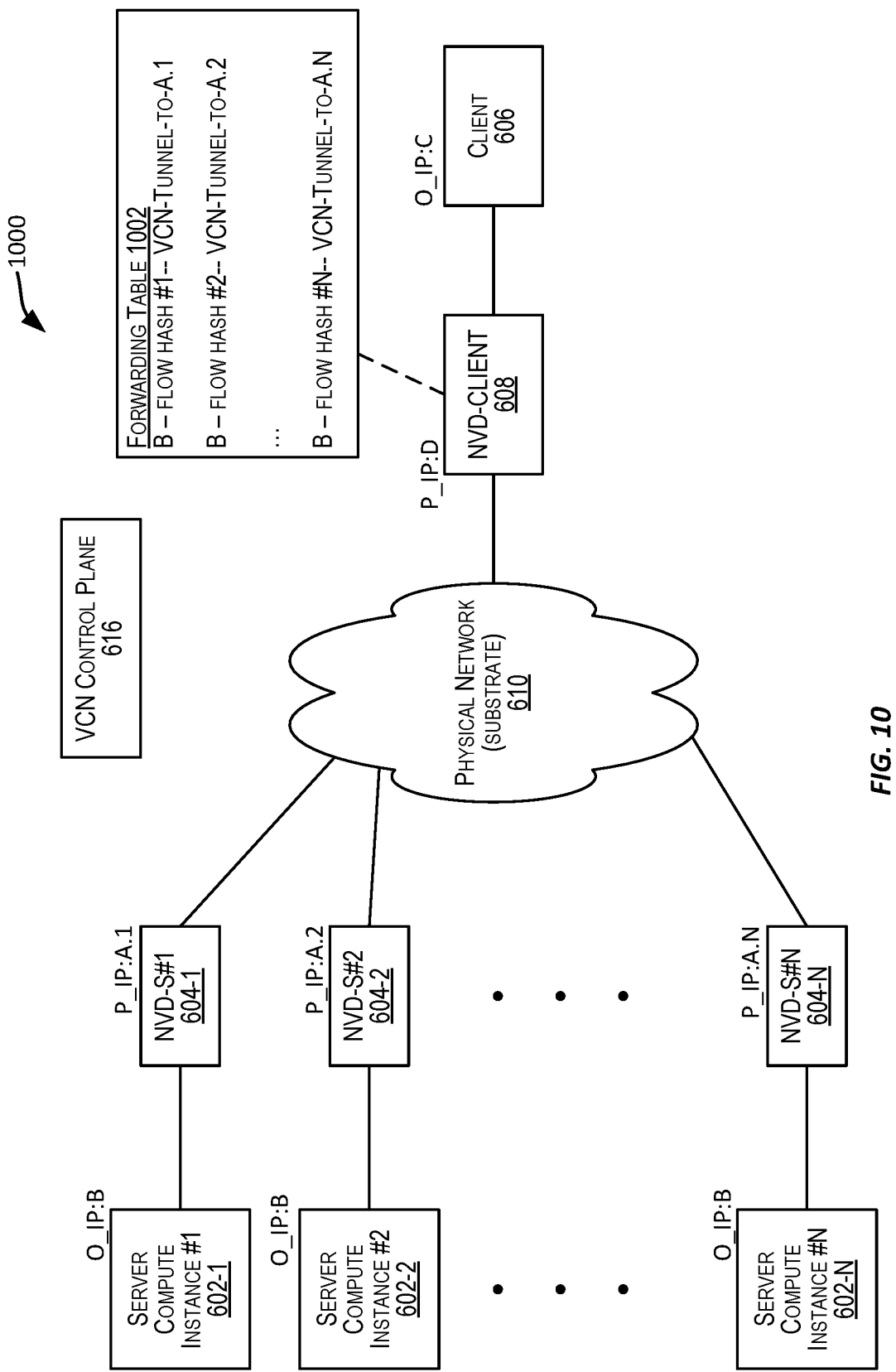
FIG. 10 shows an example of a distributed virtualized multitenant cloud environment that may be hosted by infrastructure (cloud service provider infrastructure, CSPI) provided by a cloud service provider (CSP) and which enables scaling of IP addresses using ECMP techniques and without using load balancers according to certain embodiments.

FIG. 10 shows an example of a distributed virtualized multitenant cloud environment 1000 that may be hosted by CSPI provided by a cloud service provider and which enables scaling of IP addresses using ECMP techniques and without using load balancers according to certain embodiments. Distributed environment 1000 depicted in FIG. 10 has several components that are similar to components depicted in FIG. 6A and these components are referenced using the same reference numbers as in FIG. 6A.

Distributed environment 1000 depicted in FIG. 10 is merely an example and is not intended to unduly limit the scope of claimed embodiments. Many variations, alternatives, and modifications are possible. For example, in some implementations, distributed environment 1000 may have more or fewer systems or components than those shown in FIG. 10, may combine two or more systems, or may have a different configuration or arrangement of systems. The systems, subsystems, and other components depicted in FIG. 10 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Unlike in FIG. 6A, instead of an IP Mapping Table and a Flow table, the embodiment in FIG. 10 uses a Forwarding Table 1002, where the forwarding table identifies multiple active next hop routes to NVDs associated with the server compute instances that are attached to the multi-attached IP address. For example, as shown in FIG. 10, forwarding table 1002 comprises multiple next hop paths to NVDs 604-1 to 604-N associated with the multiple server compute instances 602-1 to 602-N that are attached to the multi-attached IP address (e.g., multi-attached IP address "B"). Since there are "N" compute instances attached to the multi-attached IP address "B", there are "N" entries in forwarding table 1002, each entry identifying a flow hash value corresponding to a network flow and a physical IP address of a next hop NVD corresponding to a server compute instance. Each entry identifies a VCN tunnel to the next hop NVD. Since there are "N" compute instances that have the same multi-attached IP address "B", there are "N" hash values representing "N" network flows, with each hash value associated with a particular path to a particular next hop NVD. In this manner, the forwarding table identifies one-to-one relationships between each of the NVDs associated with the server compute instances and VCN tunnels to the NVDs. In this manner, in the forwarding table, one overlay IP address (e.g., IP address "B") is mapped to multiple next hops.

For example, the entry "B—flow hash #1—VCN-Tunnel-To-A.1" indicates that for a destination overlay IP address of "B" and where the hash value of certain fields in a packet to be forwarded is "flow hash #1" (representing a network flow #1), the next hop for the packet is an NVD with physical IP address A.1 and a VCN tunnel to A.1 to be used for forwarding the packet. As another example, entry "B—flow hash #2—VCN-Tunnel-To-A.2" indicates that for a destination IP address of "B" and where the hash value of certain fields in a packet to be forwarded is "flow hash #2" (representing network flow #2), the next hop for the packet is an NVD with physical IP address A.2 and a VCN tunnel to A.2 is to be used for forwarding the packet.

As described above, the hash values, which are based upon hashing certain fields of the packets, represent different network flows. These hash values act as indices to particular next hops. For packets belonging to a particular network flow, i.e. for packets where the hash value is the same, the packets are communicated to the same NVD and thus to the same server compute instance for processing. For example, in FIG. 10, for all packets received by NVD 608 hashing to hash value "flow hash #2", the next hop is "VCN-tunnel-to-A.2". All these packets are accordingly sent to NVD 604-2 having a physical IP address of A.2, and NVD 604-2 then forwards the packets to server compute instance 602-2.

In certain implementations, information regarding the multiple next hops associated with a multi-attached IP address is provided by the customer who provides the multiple server compute instances. The information may be provided, for example, via a console provided by the CSPI, via command line interfaces, APIs, and the like. This information is received by the VCN control plane 616, which then generates the forwarding tables, such as forwarding table 1002, and distributes the forwarding tables to the NVDs in the overlay networks.

In certain implementations, the information regarding the multiple routes may be obtained using standard routing protocols such as Border Gateway Protocol (BGP). The information may be sent to the NVDs using BGP.

Figure 11:
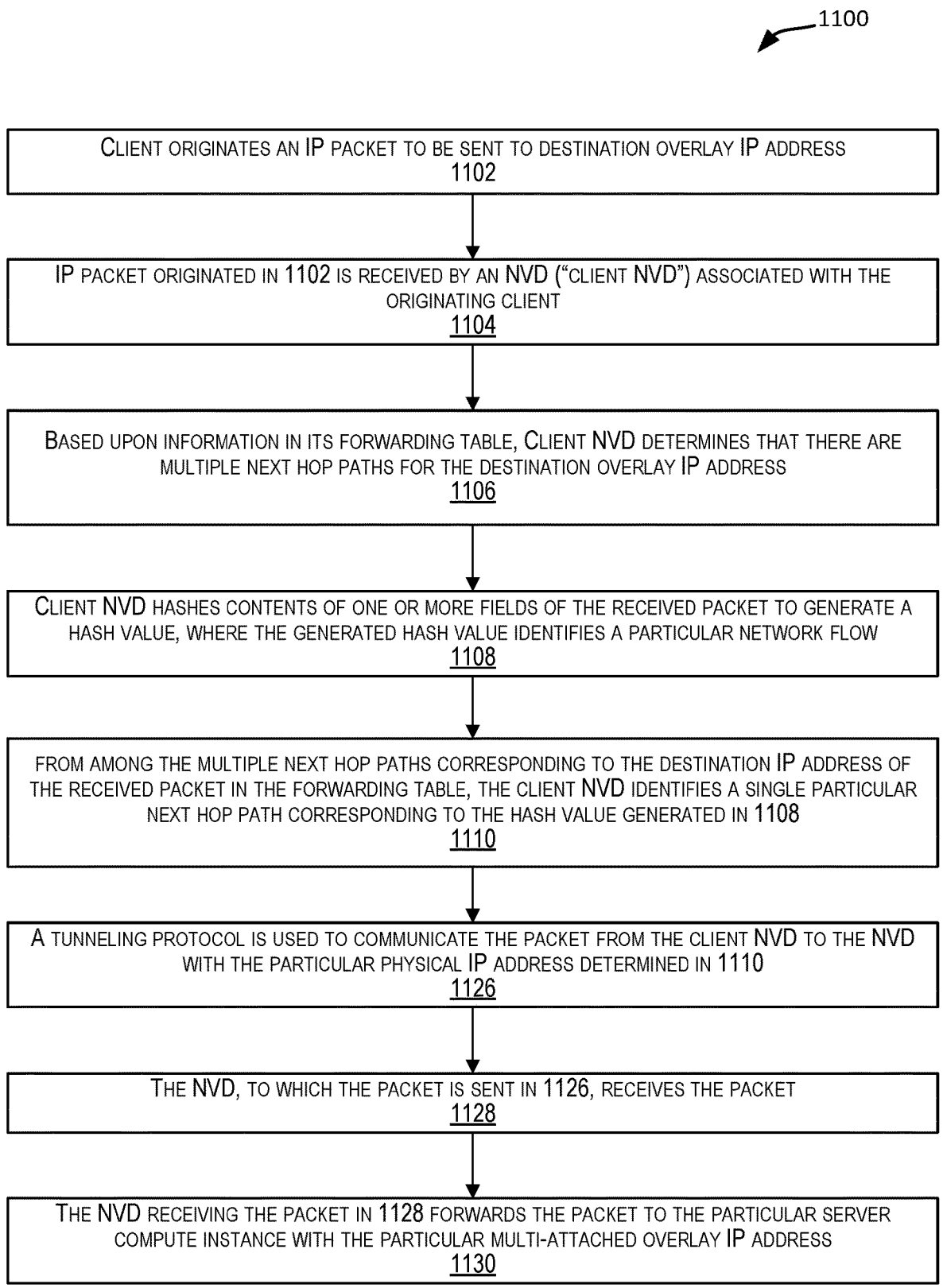
FIG. 11 depicts a simplified flowchart depicting processing for scaling an IP address in overlay networks using ECMP techniques according to certain embodiments.

FIG. 11 depicts a simplified flowchart 1100 depicting processing for scaling an IP address in overlay networks using ECMP techniques according to certain embodiments. The processing depicted in FIG. 11 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the processing may be performed in some different order or some steps may also be performed in parallel.

Some of the processing steps in FIG. 11 are similar to the processing steps depicted in FIGS. 7A, 7B, and 8. For example, the processing performed in 1102 and 1104 is similar to the processing performed in 702 and 704, respectively, in FIG. 7A and described above. At 1106, the client NVD determines, based upon entries in its forwarding table, that there are multiple next hop paths for the destination overlay IP address of the received packet. The processing in 1108 is similar to the processing in 808 in FIG. 8 where the client NVD generates a hash value by hashing the contents of one or more fields of the received packet, where the generated hash value identifies a particular network flow.

In 1110, based upon the overlay destination IP address of the received packet and based upon the hash value generated in 1108, the client NVD determines a particular next hop path from among the multiple next hop paths associated with the destination IP address in the forwarding table. The particular next hop path identified in 1110 identifies a VCN tunnel to a particular physical IP address, where the particular physical IP address is the address of a particular NVD associated with a particular server compute instance from among the multiple server compute instances associated with the same overlay IP address. For example, in FIG. 10, given that the destination IP address of the received packet is "B" and assuming that the hash value generated in 1108 is "Flow Hash #2", then based upon the information in Forwarding Table 1002, the next hop path selected by the NVD is "VCN-Tunnel-To-A.2" identifying A.2 as the physical IP address of an NVD to which the packet is to be sent.

A tunneling protocol is then used to send the packet from the NVD receiving the packet in 1104 to the NVD associated with the particular physical IP address determined in 1110 and identified as the next hop for the packet. The processing in 1126, 1128, and 1130, is similar to the processing in 726, 728, and 730 depicted in FIG. 7B and described above.

In the manner described above, ECMP techniques may be used to scale an IP address in overlay networks. Many of the features and functionalities described above for the multi-attached IP address implementations also apply and are available in the ECMP implementations. For example, compute instances associated with the single overlay IP address can initiate new connections or communications with clients, who can respond to those communications. For example, the processing depicted in FIGS. 9A and 9B, and described above, also apply to ECMP-based implementations.

Various different flavors of ECMP techniques may be used including n-ways ECMP, ECMP with flow based traffic distribution, "weighted" ECMP with flow-based traffic distribution. In certain implementations, health checks may also be added to determine the health of next hops. The health checks could be either peer-to-peer between NVDs or may be initiated from a centralized service. ECMP with dynamic routing for Route-Health-Injection (RHI) may be provided.

Example Cloud Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
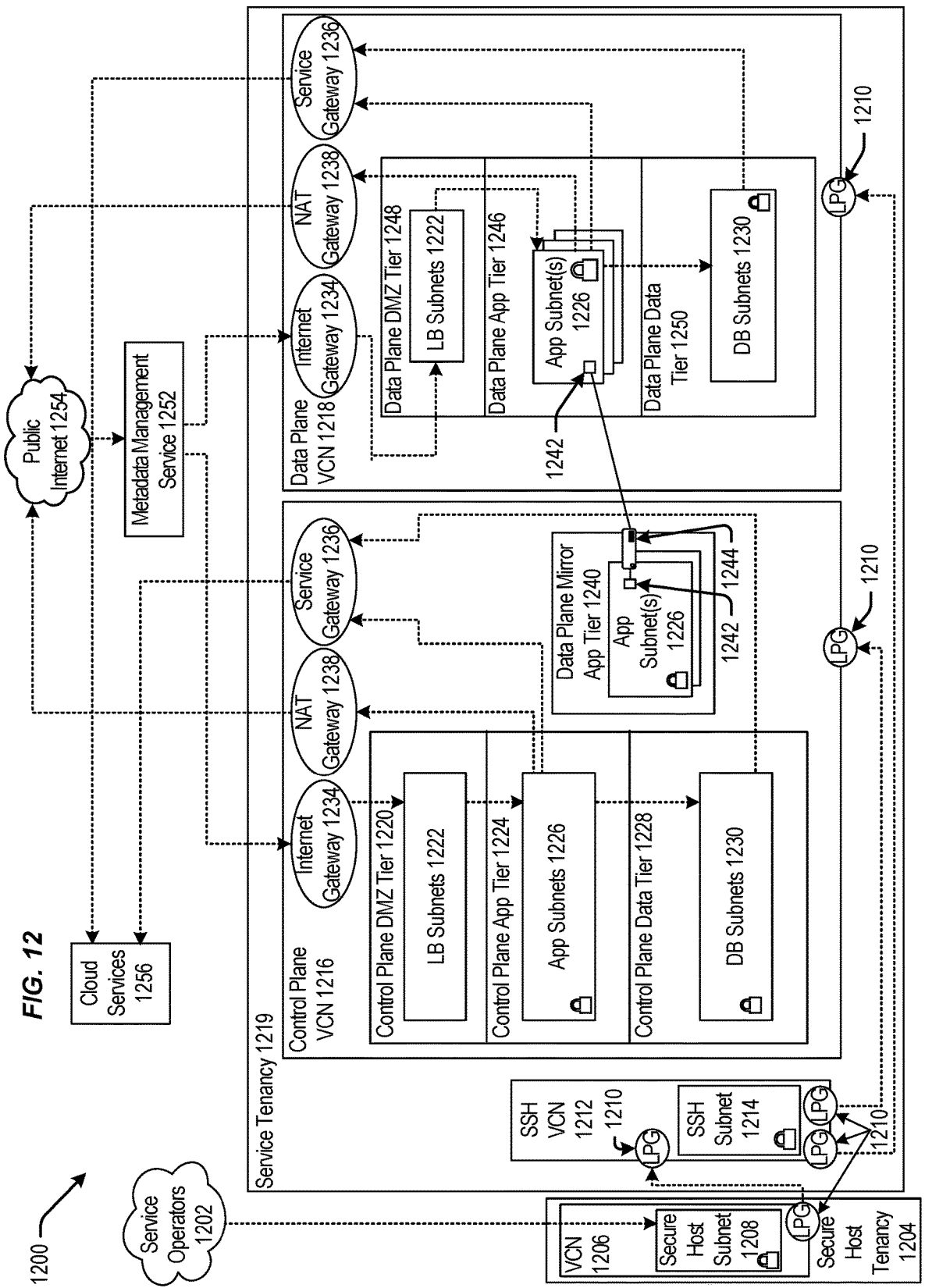
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
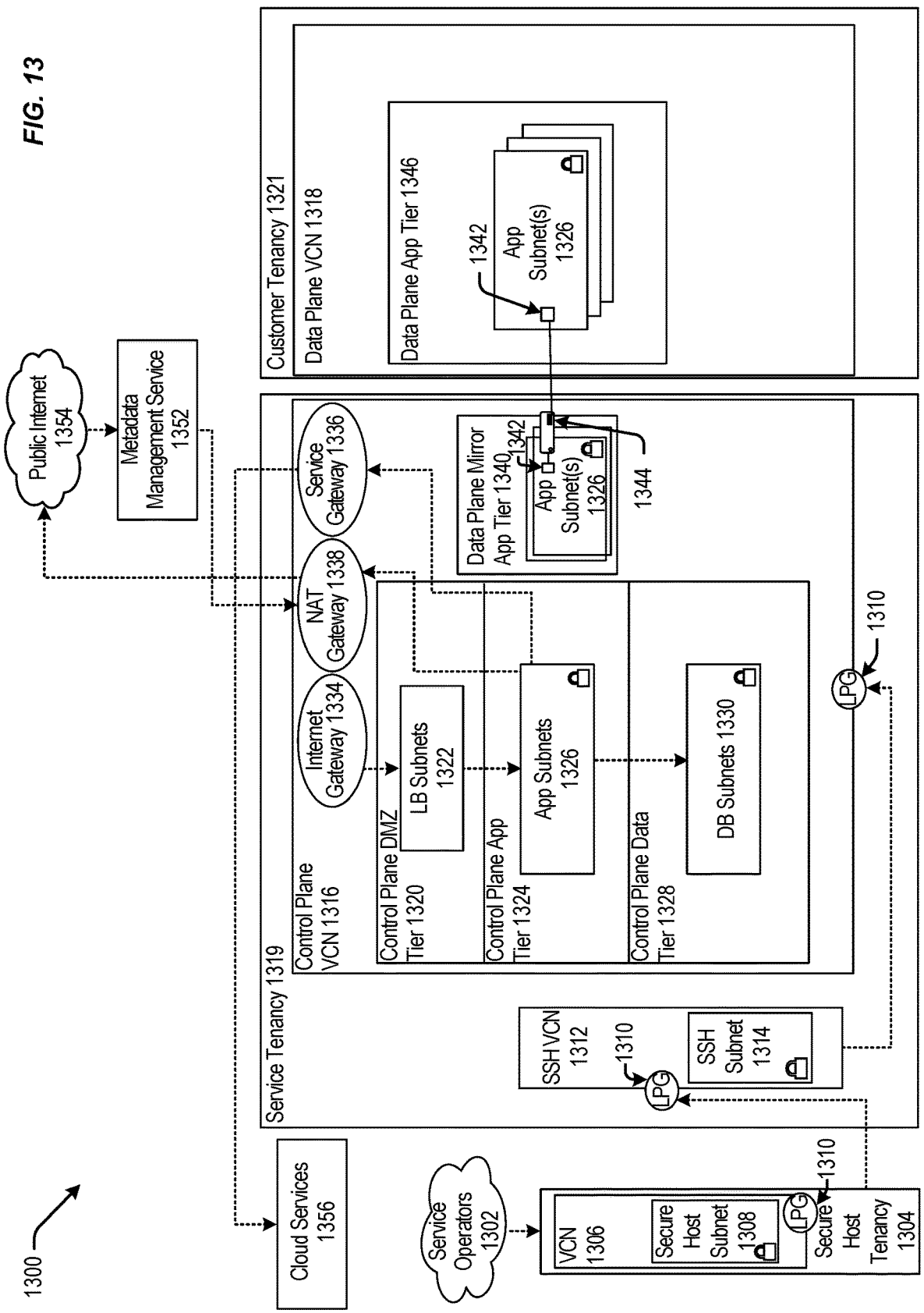
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 1204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1210 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g. the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g. the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g. the metadata management service 1252 of FIG. 12) that can be communicatively coupled to public Internet 1354 (e.g. public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g. cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
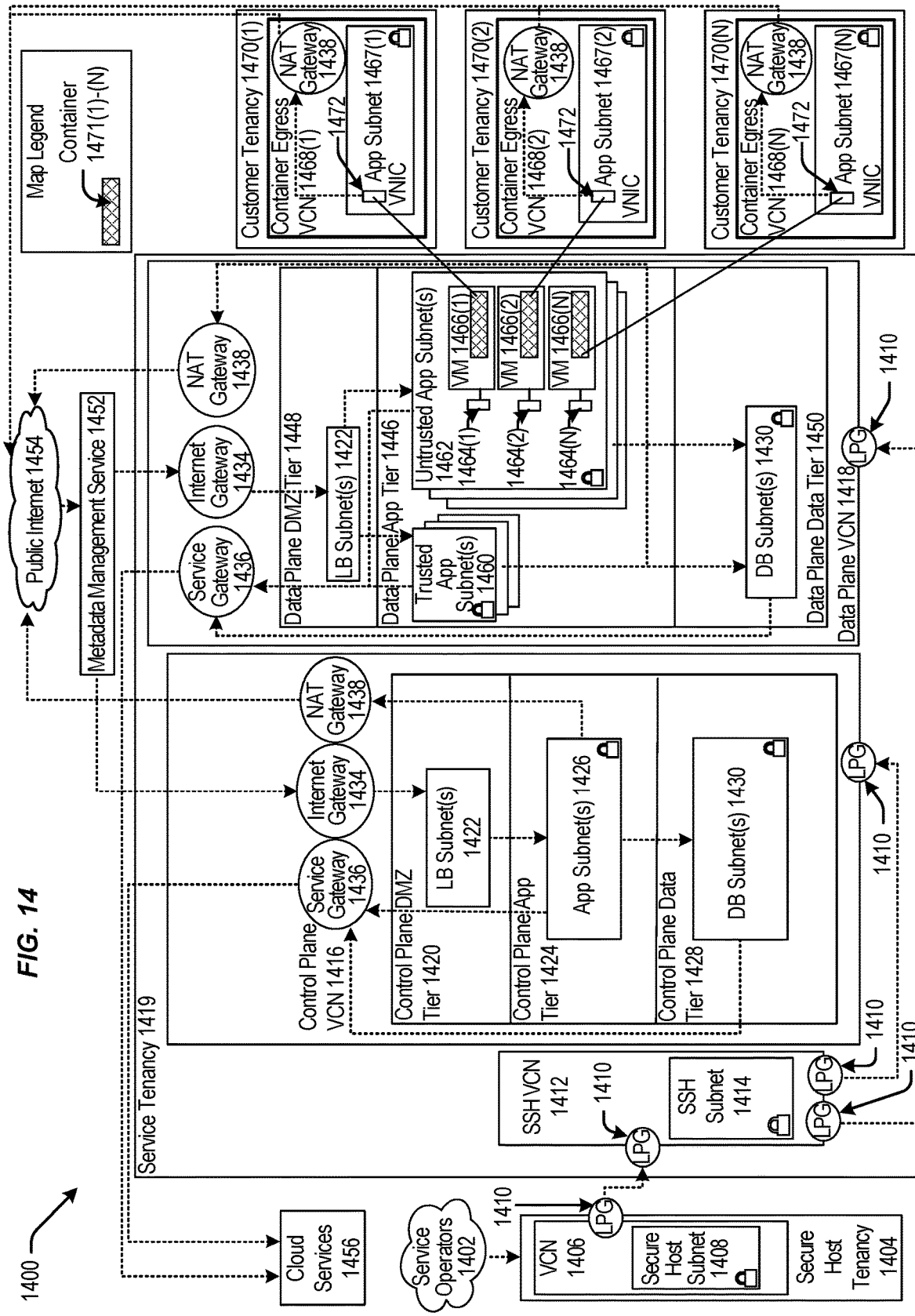
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
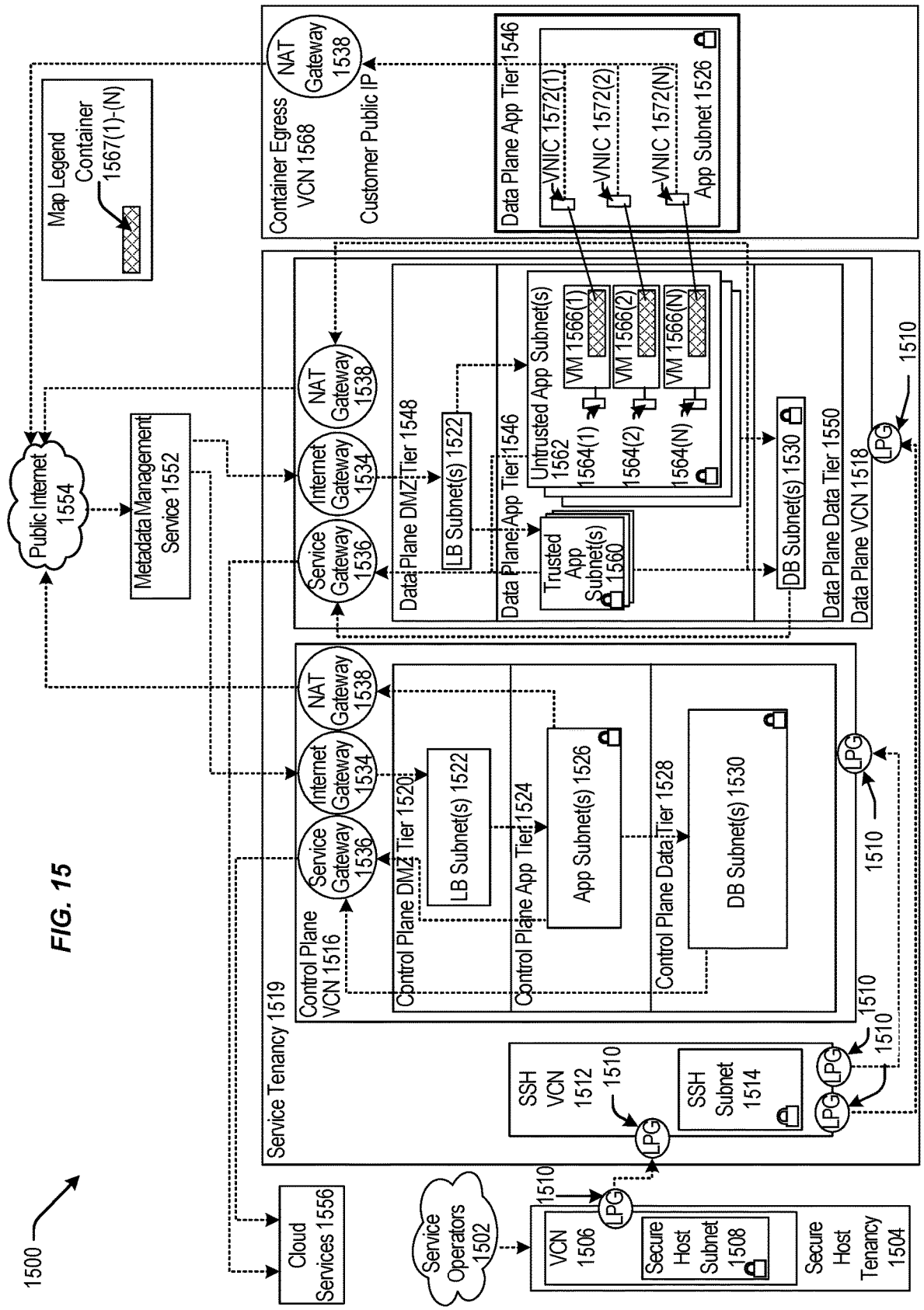
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
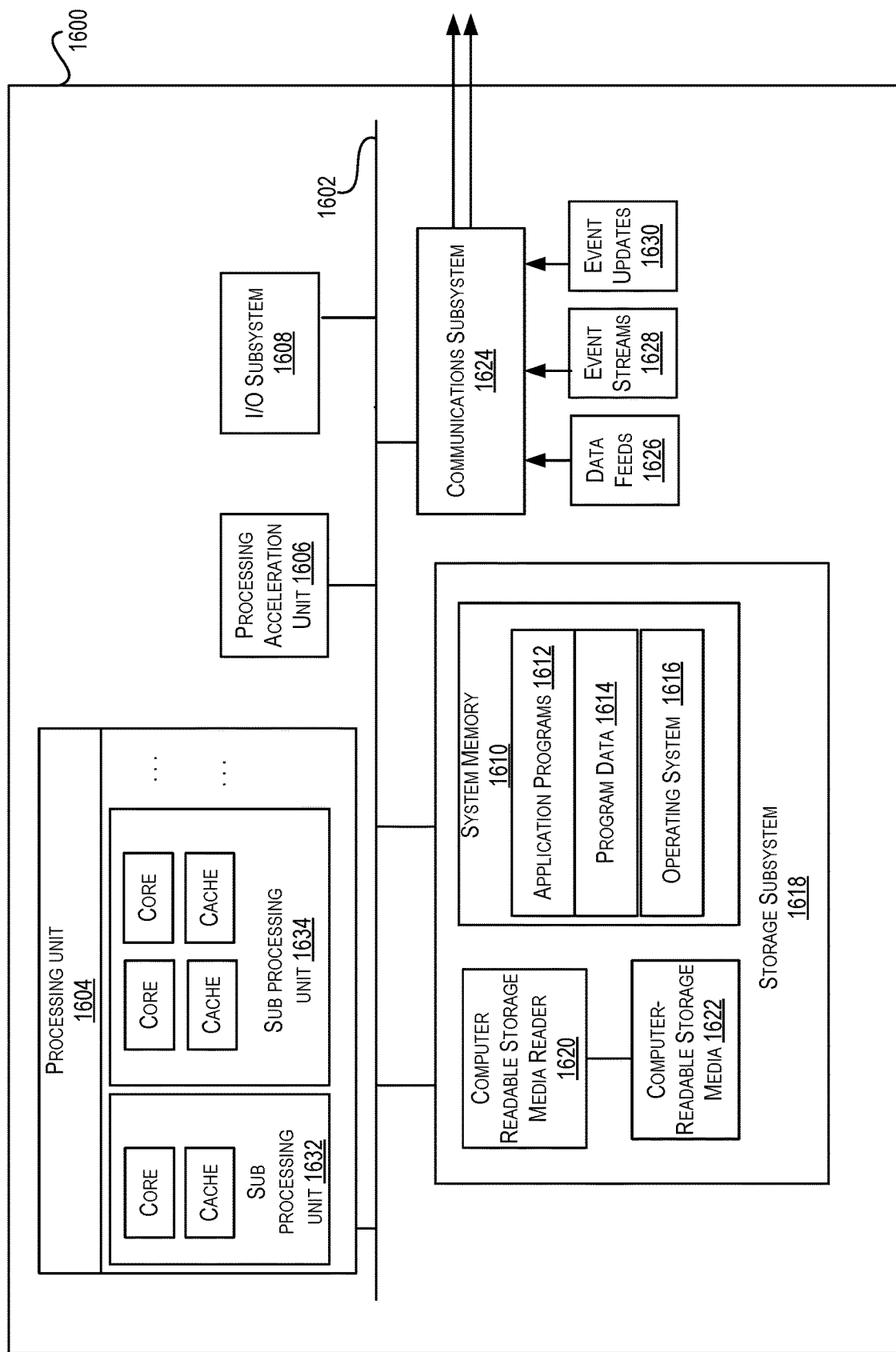
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    for a first packet whose destination address is a first Internet Protocol (IP) address, determining by a first network virtualization device (NVD) receiving the first packet that a plurality of IP addresses is associated with the first IP address, wherein the first IP address of the first packet is attached to each compute instance of a plurality of compute instances, each IP address of the plurality of IP addresses is different than the first IP address, and the plurality of IP addresses includes IP addresses of a plurality of NVDs associated with the plurality of compute instances;
    selecting, by the first NVD, a particular IP address from the plurality of IP addresses,
    wherein the particular IP address is of a particular NVD from the plurality of NVDs,
    wherein the particular NVD is associated with a first compute instance from the plurality of compute instances, and
    wherein the particular IP address is selected based on an IP mapping table associated with the particular NVD, wherein the IP mapping table maps the first IP address that is a destination address to one or more of a plurality of physical IP addresses; and
    communicating, by the first NVD and using a tunneling protocol, the first packet to the particular IP address that was selected from the plurality of IP addresses, without changing the destination address of the first packet.

2. The method of claim 1 wherein determining that the plurality of IP addresses is associated with the first IP address comprises:
    determining, by the first NVD, based upon IP mapping information, that the first IP address maps to the plurality of IP addresses.

3. The method of claim 1 wherein determining that the plurality of IP addresses is associated with the first IP address comprises:
    determining, by the first NVD, based upon information in a forwarding table, that a plurality of next hop routes is associated with the first IP address, the plurality of next hop routes identifying the plurality of IP addresses.

4. The method of claim 1 wherein selecting the particular IP address comprises:
    generating, by the first NVD, a hash value based upon contents of one or more fields of the first packet; and
    using the hash value to select the particular IP address from the plurality of IP addresses.

5. The method of claim 4 wherein generating the hash value comprises using a consistent hashing technique.

6. The method of claim 1 wherein selecting the particular IP address comprises:
    determining, by the first NVD, that the first packet belongs to a first network flow;
    identifying, by the first NVD, from flow information stored by the first NVD, a first entry corresponding to the first network flow; and
    determining, by the first NVD, that the particular IP address is specified in the first entry as being associated with the first network flow.

7. The method of claim 1 further comprising:
    determining, by the first NVD, that the first packet belongs to a first network flow;
    determining, by the first NVD, that flow information stored by the first NVD does not include any entry corresponding to the first network flow; and
    selecting, by the first NVD, the particular IP address from the plurality of IP addresses using a first selection technique.

8. The method of claim 7 further comprising:
    adding, by the first NVD, an entry to the flow information identifying the first network flow and associating the particular IP address with the first network flow.

9. The method of claim 1 wherein the first IP address is an overlay IP address,
    wherein the addresses in the plurality of IP addresses are physical IP addresses, and
    wherein a physical address is associated with a component in a physical network.

10. The method of claim 1 further comprising:
    for a second packet received by the first NVD, determining by the first NVD that the second packet has the first IP address as its destination address;
    selecting, by the first NVD, a second particular IP address from the plurality of IP addresses, wherein the second particular IP address is of a second particular NVD from the plurality of NVDs, and the second particular NVD is associated with a second compute instance from the plurality of compute instances; and
    communicating, by the first NVD, the second packet to the second particular IP address.

11. The method of claim 10 wherein:
    the first packet is sent by a first client and the second packet is sent by a second client, where the first client is different from the second client.

12. The method of claim 1 further comprising:
    receiving, by the particular NVD from the plurality of NVDs, a new packet from the first compute instance, the new packet identifying a destination IP address for a destination client; and
    determining, by the particular NVD, whether the new packet is for a new connection or communication to be established between the first compute instance and the destination client, or whether the new packet is a response packet sent by the first compute instance in response to a packet previously received by the first compute instance from the destination client.

13. The method of claim 12,
    wherein determining whether the new packet is for a new connection or is a response packet comprises determining that the new packet is for a new connection or communication to be established between the first compute instance and the destination client;

the method further comprising:
- identifying an ephemeral port value to be used for the new packet;
- setting a source port field of the new packet to the identified ephemeral port value; and
- communicating the new packet from the particular NVD to an NVD associated with the destination client.

14. The method of claim 13 wherein identifying the ephemeral port comprises:
- selecting the ephemeral port value to be used for the new packet from a range of ephemeral port values allocated to the first compute instance, wherein the ephemeral port values in the range of ephemeral port values allocated to the first compute instance are different from ephemeral port values allocated to the other compute instances in the plurality of compute instances.

15. The method of claim 13 wherein:
- identifying the ephemeral port value comprises:
  - sending, by the particular NVD, a request to a service requesting one or more ephemeral port values; and
  - receiving, by the particular NVD and from the service, a set of one or more ephemeral port values;
- setting the source port field of the new packet comprises setting the source port field to a value from the set of one of more ephemeral port values.

16. The method of claim 12,
- wherein determining whether the new packet is for a new connection or is a response packet comprises determining that the new packet is a response packet; and
- the method further comprising communicating the new packet from the particular NVD to an NVD associated with the destination client.

17. The method of claim 13 wherein determining whether the new packet is for a new connection or is a response packet comprises performing at least one of the following:
- identifying the new packet as a response packet if the new packet contains an acknowledgment;
- identifying the new packet as a response packet if a value in the source port field of the new packet is not the ephemeral port value; or
- identifying the new packet as a response packet if the particular NVD determines that the new packet is part of an existing network flow.

18. A non-transitory computer-readable memory storing a plurality of instructions executable by one or more processors, the plurality of instructions comprising instructions that when executed by the one or more processors perform processing comprising:
- for a first packet whose destination address is a first Internet Protocol (IP) address, determining that a plurality of IP addresses are associated with the first IP address,
- wherein the first IP address of the first packet is attached to each compute instance of a plurality of compute instances, each IP address of the plurality of IP addresses is different than the first IP address, and the plurality of IP addresses includes IP addresses of a plurality of network virtualization devices (NVDs) associated with the plurality of compute instances;
- selecting a particular IP address from the plurality of IP addresses,
- wherein the particular IP address is of a particular NVD from the plurality of NVDs,
- wherein the particular NVD is associated with a first compute instance from the plurality of compute instances, and
- wherein the particular IP address is selected based on an IP mapping table associated with the particular NVD, wherein the IP mapping table maps the first IP address that is a destination address to one or more of a plurality of physical IP addresses; and
- communicating, using a tunneling protocol, the first packet to the particular IP address that was selected from the plurality of IP addresses, without changing the destination address of the first packet.

19. A system comprising:
one or more processors; and
a memory storing a plurality of instructions which when executed by the one or more processors cause the system to:
- for a first packet whose destination address is a first Internet Protocol (IP) address, determine that a plurality of IP addresses are associated with the first IP address, wherein the first IP address of the first packet is attached to each compute instance of a plurality of compute instances, each IP address of the plurality of IP addresses is different than the first IP address, and the plurality of IP addresses includes IP addresses of a plurality of network virtualization devices (NVDs) associated with the plurality of compute instances;
- select a particular IP address from the plurality of IP addresses,
- wherein the particular IP address is of a particular NVD from the plurality of NVDs,
- wherein the particular NVD is associated with a first compute instance from the plurality of compute instances, and
- wherein the particular IP address is selected based on an IP mapping table associated with the particular NVD, wherein the IP mapping table maps the first IP address that is a destination address to one or more of a plurality of physical IP addresses; and
- communicate, using a tunneling protocol, the first packet to the particular IP address that was selected from the plurality of IP addresses, without changing the destination address of the first packet.

20. The method according to claim 1, wherein the IP mapping table is generated by a virtual cloud network (VCN) control plane, and wherein the VCN control plane publishes the IP mapping table to NVDs in an overlay network.

* * * * *

UNITED STATES PATENT AND TRADEMARK OFFICE
CERTIFICATE OF CORRECTION

| | | |
|---|---|---|
| PATENT NO. | : 11,743,233 B2 | Page 1 of 1 |
| APPLICATION NO. | : 17/175285 | |
| DATED | : August 29, 2023 | |
| INVENTOR(S) | : King et al. | |

It is certified that error appears in the above-identified patent and that said Letters Patent is hereby corrected as shown below:

In the Drawings

On sheet 2 of 19, in FIG. 2, under Reference Numeral 268, Line 2, delete "INTANCE" and insert -- INSTANCE --, therefor.

On sheet 2 of 19, in FIG. 2, under Reference Numeral 274, Line 2, delete "INTANCE" and insert -- INSTANCE --, therefor.

In the Specification

In Column 20, Line 20, delete "and or" and insert -- and/or --, therefor.

In Column 38, Line 13, delete "(0x06)," and insert -- (0x06)), --, therefor.

In Column 43, Line 30, delete "606." and insert -- 606). --, therefor.

In Column 44, Lines 18-19, delete "implementations." and insert -- implementations, --, therefor.

In Column 52, Line 6, delete "like." and insert -- like). --, therefor.

In Column 64, Line 61, delete "evolution)," and insert -- evolution)), --, therefor.

Signed and Sealed this
Twenty-fifth Day of June, 2024

*Katherine Kelly Vidal*

Katherine Kelly Vidal
*Director of the United States Patent and Trademark Office*